United States Patent
Uhrich et al.

(10) Patent No.: US 10,233,817 B2
(45) Date of Patent: Mar. 19, 2019

(54) METHOD AND SYSTEM FOR EXHAUST GAS HEAT RECOVERY

(71) Applicant: Ford Global Technologies, LLC, Dearborn, MI (US)

(72) Inventors: Michael James Uhrich, West Bloomfield, MI (US); Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 368 days.

(21) Appl. No.: 15/151,341

(22) Filed: May 10, 2016

(65) Prior Publication Data

US 2017/0328263 A1 Nov. 16, 2017

(51) Int. Cl.
| | |
|---|---|
| F02D 23/00 | (2006.01) |
| F01P 3/20 | (2006.01) |
| F02M 26/06 | (2016.01) |
| F01N 5/02 | (2006.01) |
| F02B 37/18 | (2006.01) |

(52) U.S. Cl.
CPC ............ F01P 3/20 (2013.01); F01N 5/02 (2013.01); F02B 37/183 (2013.01); F02M 26/06 (2016.02); F01P 2060/08 (2013.01); Y02T 10/144 (2013.01)

(58) Field of Classification Search
CPC .......... F02M 26/06; F02M 26/22; F01N 5/02; F02B 37/183; F01P 3/20
See application file for complete search history.

(56) References Cited

U.S. PATENT DOCUMENTS

| | | | |
|---|---|---|---|
| 7,043,912 | B1 | 5/2006 | Radcliff et al. |
| 7,111,617 | B2 | 9/2006 | Dilley et al. |
| 2012/0017575 | A1 | 1/2012 | Sloss |
| 2015/0047317 | A1* | 2/2015 | Ulrey ..................... F02B 47/08 60/273 |

FOREIGN PATENT DOCUMENTS

JP          2016217295 A  * 12/2016  ............. F02M 26/22

* cited by examiner

*Primary Examiner* — Ngoc T Nguyen
(74) *Attorney, Agent, or Firm* — Julia Voutyras; McCoy Russell LLP

(57) ABSTRACT

Methods and systems are provided for controlling exhaust flow and recovering heat from exhaust gas under different operating conditions. In one example, motive flow of fresh air via an ejector coupled to an exhaust bypass assembly may be utilized to divert exhaust through a heat exchanger during cold-start conditions and heat extracted from the exhaust gas may be utilized for passenger cabin heating and other vehicle heating demands. The exhaust bypass assembly may also be used for EGR delivery wherein the exhaust heat exchanger may be used as an EGR cooler.

20 Claims, 10 Drawing Sheets

1st MODE

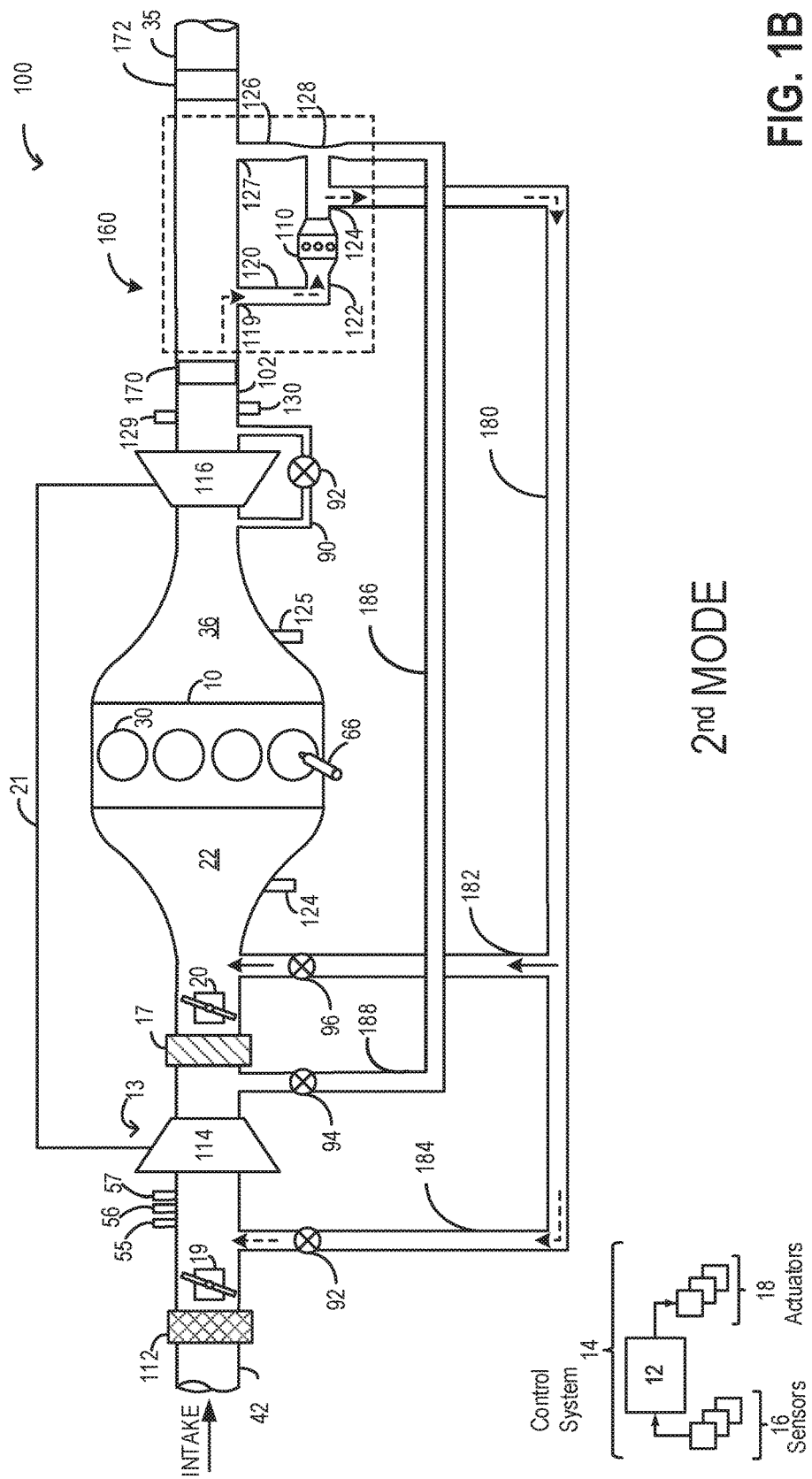
FIG. 1B 2nd MODE

1st MODE

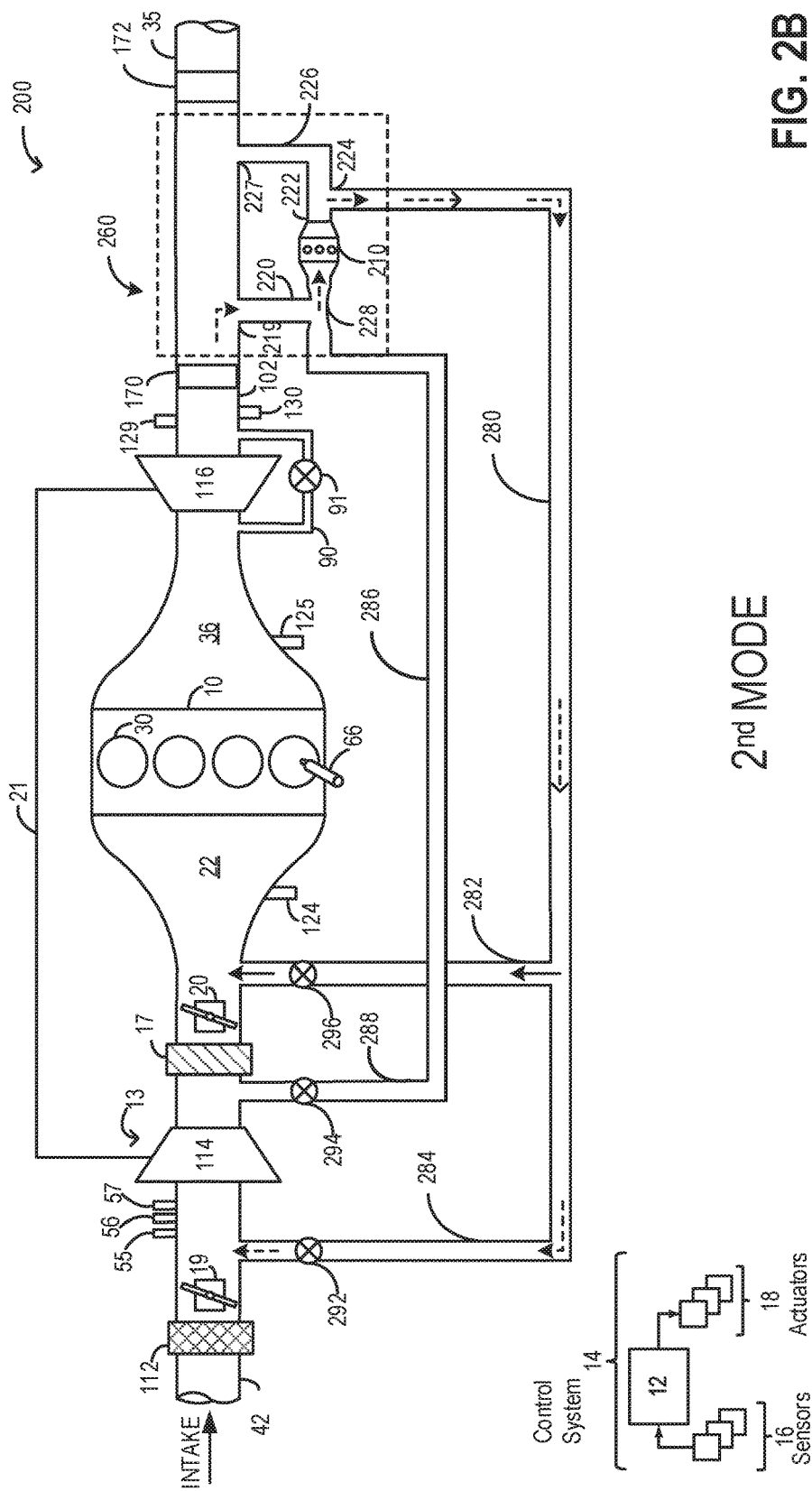
FIG. 2B  2nd MODE

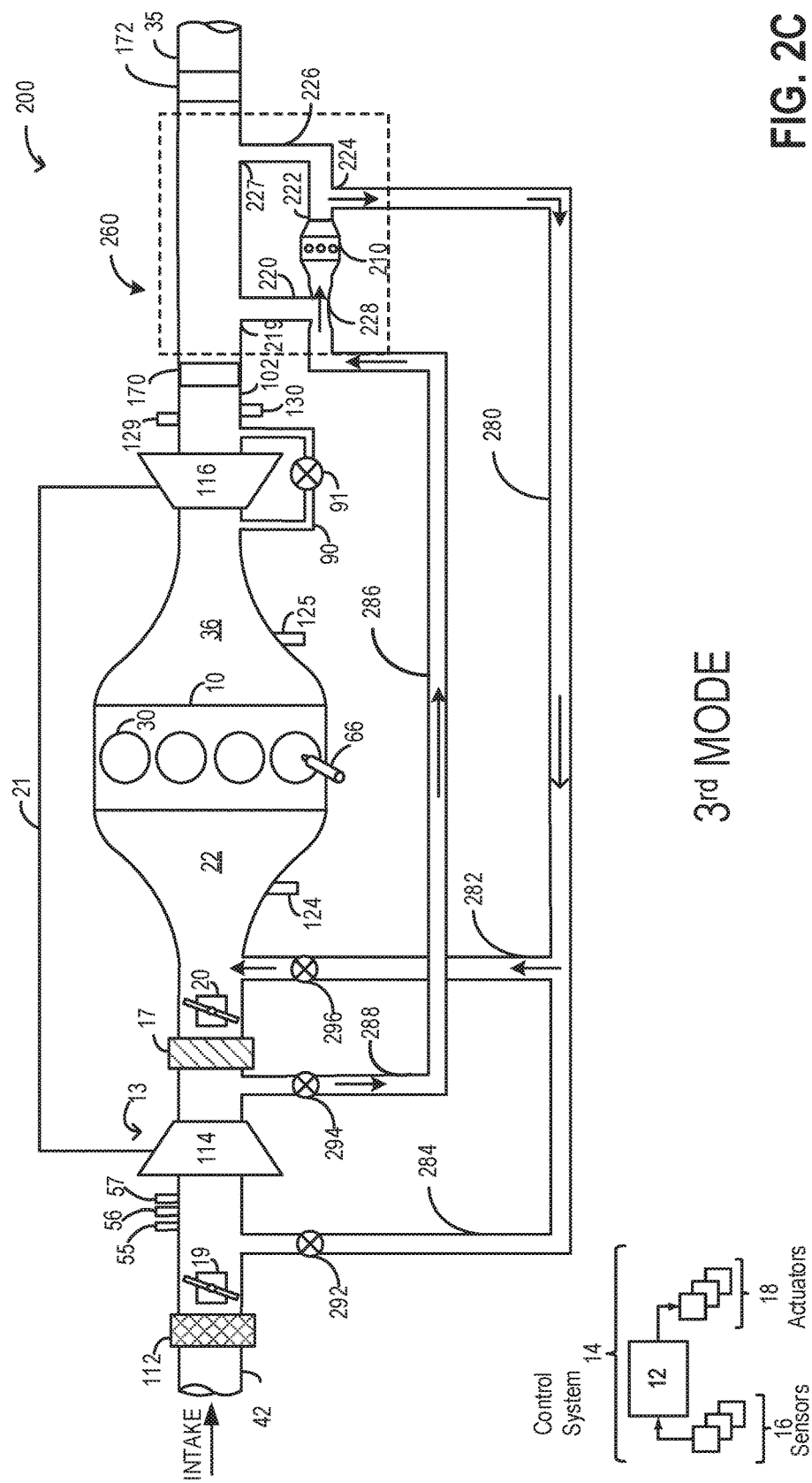

4th MODE

| Engine operating mode | Valve system mode | Valve_1 position | Valve_2 position | Valve_3 position | Engine sytem |
|---|---|---|---|---|---|
| 1 – Cold start, No EGR desired | First | Open | Closed | Closed | FIGS. 1 and 2 |
| 2 – Engine warm, EGR desired | Second | Open/closed | Open | Open | FIGS. 1 and 2 |
| 3 – Engine warm, No EGR desired | Third | Closed | Closed | Closed | FIGS. 1 and 2 |
| 4 – Heated intake air desired, No EGR desired | Fourth | Open | Open | Closed | FIG. 2 |
| 5 – Compressor bypass flow desired | Fifth | Open | Closed | Open | FIG. 2 |
| 6 – CAC condensate purge desired | First | Open | Closed | Closed | FIG. 1 and 2 alternate embodiment |

FIG. 5

METHOD AND SYSTEM FOR EXHAUST GAS HEAT RECOVERY

FIELD

The present description relates generally to methods and systems for controlling a vehicle engine to recover heat from exhaust gas under different operating conditions.

BACKGROUND/SUMMARY

Engines may be configured with an exhaust heat recovery system for recovering heat from exhaust gas generated at an internal combustion engine. The heat is transferred from the hot exhaust gas to a coolant through an exhaust gas heat exchanger system. The heat from the coolant may be utilized for functions such as heating the cylinder head and warming the passenger cabin. Exhaust heat may also be retrieved at an exhaust gas recirculation (EGR) cooler. An EGR cooler may be coupled to an EGR delivery system to bring down the temperature of recirculated exhaust gas before it is delivered to the intake manifold. EGR may be used to reduce exhaust NOx emissions. Further, EGR may be used to assist in the reduction of throttling losses at low loads, and to improve knock tolerance.

Various approaches are provided for exhaust heat recovery and EGR cooling. In one example, as shown in US 20120017575, Sloss discloses an exhaust assembly with an exhaust bypass passage having a diverter valve for controlling the flow of exhaust gas into the main exhaust passage and/or the bypass passage. A heat exchanger may be coupled to the main exhaust passage. The diverter valve is utilized to selectively direct exhaust flow through the heat exchanger during conditions such as cold-start when exhaust heat recovery is desired. During conditions when exhaust heat recovery is not required and/or when heat exchanger working limit has been reached, the diverter valve may be positioned to route the exhaust via the bypass passage thereby bypassing the heat exchanger. In still other approaches, a heat exchanger may be positioned in the bypass passage and a diverter valve may be used to redirect exhaust through the heat exchanger in the bypass during cold-start conditions, the exhaust then redirected through the main exhaust passage once the engine is warm enough.

However, the inventors herein have recognized potential disadvantages with the above approaches. As one example, in approaches requiring diverter valves to route exhaust through the heat exchanger coupled to the exhaust passage, component costs are increased. As such, both electrically and pneumatically actuated valves add significant component costs. For electrically actuated valves, the valve may be more expensive. For the pneumatically actuated valves, component costs may be increased due to the associated hardware required for vacuum actuation of such valves. The valves may also be difficult to seal without leakage. Coordinating the operation of the diverter valves with other engine system components may also result in additional control complexity. Also, in the system of US 20120017575, even though heat is extracted from exhaust at a heat exchanger, the cooled exhaust is not recirculated, resulting in the need for an additional EGR cooler.

In still further approaches, during the cold-start condition, a wastegate valve coupled across an exhaust turbine is opened to enable heated exhaust to be directed to an exhaust catalyst (to expedite catalyst light-off) and a heat exchanger (for heat recovery). Herein by not directing the exhaust through the turbine, exhaust heat loss at the turbine is reduced, allowing for a larger portion of the exhaust heat to be recovered at the heat exchanger.

However the inventors have identified potential issues with such approaches too. As one example, opening the wastegate to enable increased exhaust heat recovery during a cold-start can result in delays in turbine spin-up (turbo lag), and thereby a delay in providing a demanded boost pressure. If the wastegate were closed to expedite turbine spooling, exhaust heat recovery would be limited, resulting in a cabin heating demand not being met. In addition, the exhaust reaching the catalyst post-turbine would be cooler, delaying catalyst light-off. As such, this could degrade cold-start emissions.

The inventors herein have identified an approach by which the issues described above may be at least partly addressed. One example method for a boosted engine comprises: during an engine cold-start condition, closing a wastegate coupled across an exhaust turbine while flowing air from downstream of an intake compressor to a tailpipe via an ejector; and drawing exhaust flow from downstream of an exhaust catalyst into a heat exchanger coupled in an exhaust bypass via ejector generated vacuum. In this way, during a cold-start, exhaust heat may be recovered for engine heating while a turbine spools up.

In one example, an engine system may be configured with a heat exchanger positioned downstream of a catalytic convertor in an exhaust bypass disposed parallel to a main exhaust passage. An ejector may be coupled to the exhaust bypass assembly, for example, downstream of the heat exchanger. As elaborated herein, motive flow through the ejector may be used to create ejector vacuum that is then used for drawing in exhaust from the main exhaust passage into the heat exchanger. As a result, the lower cost ejector is used to perform the function of the higher cost diverter valve. During cold-start conditions, a wastegate valve coupled to a wastegate passage of an exhaust turbine may be closed, allowing the turbine to spool up. At the same time, a portion of intake air may be routed from downstream of the compressor to an exhaust tailpipe via the ejector. By flowing air through the ejector, a low pressure area may be created across the heat exchanger which facilitates drawing in of hot exhaust into the heat exchanger, the exhaust then expelled to the atmosphere via the tailpipe. During the flow of exhaust through the heat exchanger, heat may be transferred to a coolant circulating through the heat exchanger, the hot coolant then used for functions such as cabin heating. Based on a heating demand at the cold-start (e.g., cabin heating demand), the routing of boosted air via the ejector may be adjusted. When exhaust heat recovery is no longer desired, such as when cabin heating demand is met, air flow through the ejector may be suspended. Due to the lack of motive flow through the ejector, exhaust may resume flowing directly to the tailpipe through the main exhaust passage without being diverted into the bypass with the heat exchanger. The heat exchanger may now be utilized as an EGR cooler by recirculating exhaust gas to the engine intake via the heat exchanger while bypassing the ejector. Optionally, the heat recovered at the heat exchanger during EGR flow may also be transferred to the circulating coolant. In an alternate embodiment, the ejector may be positioned upstream of the heat exchanger in the bypass assembly such that all flow through the heat exchanger (including flow of intake air and flow of EGR) is directed via the ejector.

In this way, by utilizing an ejector coupled to an exhaust bypass assembly, heating requirements of an engine system may be met during cold-start conditions, reducing the need for costly exhaust diverter valves. By coupling the ejector to a heat exchanger in the bypass assembly, motive flow through the ejector may be used to draw at least some exhaust from a main exhaust passage into the heat exchanger, allowing for increased exhaust heat recovery. By using the exhaust heat recovered during cold-start conditions for cabin heating, the electrical load of the engine may be reduced. The technical effect of closing the waste gate valve during cold-start conditions is that turbine spin-up can be expedited, and boosted intake air may be provided earlier during engine operation. By positioning the heat exchanger and ejector downstream of an exhaust catalyst, emissions quality may not be degraded even if there are minor leaks. In addition, by reducing the reliance on diverter valves, the occurrence of leaks is reduced. By operating the heat exchanger for exhaust heat recovery during some conditions and as an EGR cooler during other conditions, the need for a dedicated EGR cooler is reduced, providing component reduction benefits. Overall, by improving the amount of waste heat that can be recovered from exhaust using fewer components, engine fuel economy, and performance may be improved. In addition, by enabling exhaust heat to be recovered while a turbine is spooled up, boost control is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1A-1B show an example embodiment of an engine system including an exhaust bypass assembly with an ejector and a heat exchanger.

FIGS. 2A-2D show another example embodiment of an engine system including an exhaust bypass assembly with an ejector and a heat exchanger.

FIG. 5 shows a table illustrating the different modes of operation of the exhaust bypass assembly and the EGR system.

DETAILED DESCRIPTION

Figure 1A:
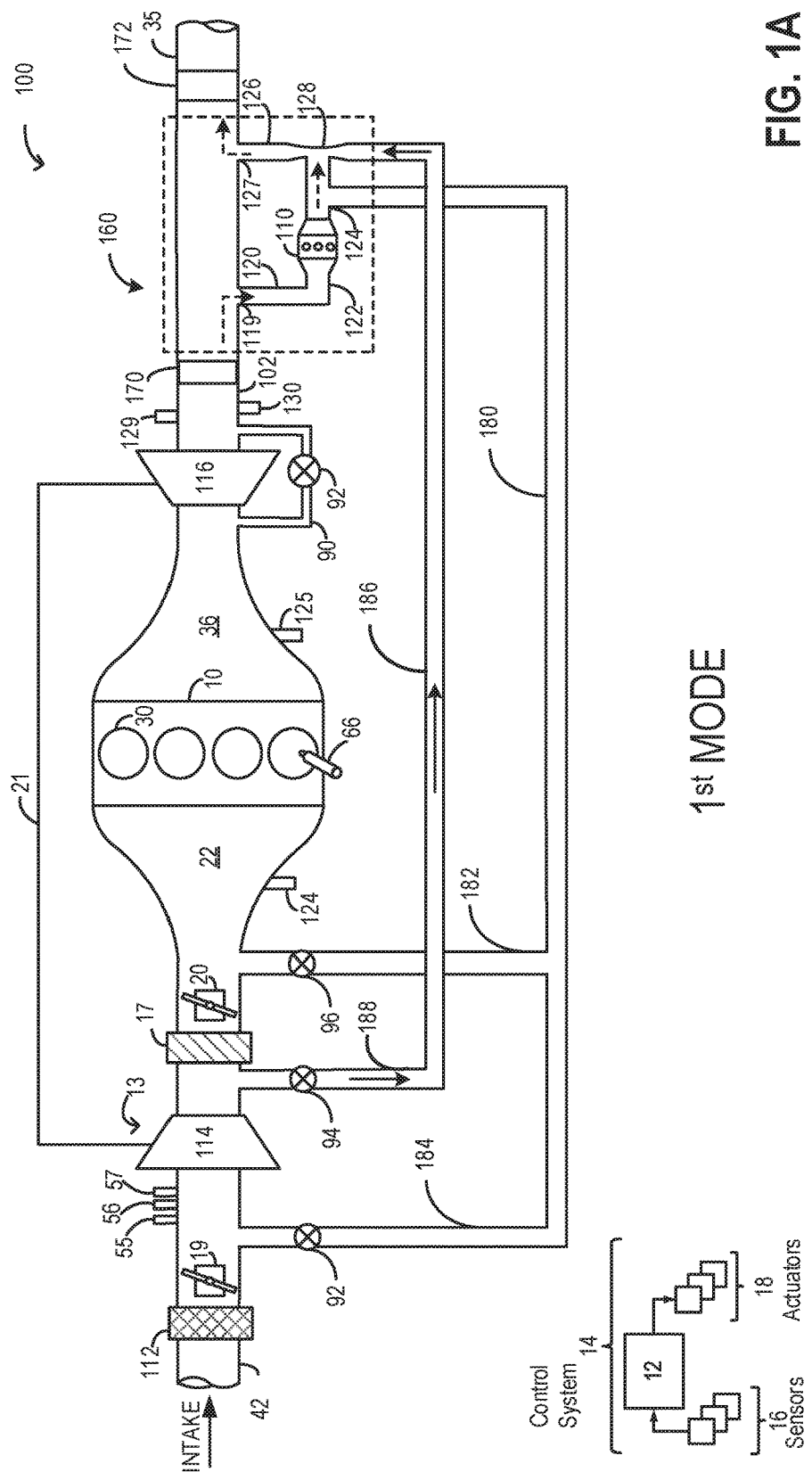

The following description relates to systems and methods for improving exhaust heat recovery using a single heat exchanger coupled to an exhaust bypass without the requirement of exhaust diverter valve(s). Example engine systems comprising an exhaust bypass assembly and their different modes of operation are shown in FIGS. 1A-1B and 2A-2D. In FIGS. 1A-1B, an ejector is housed in the exhaust bypass assembly downstream of the heat exchanger to enable flow of exhaust through the heat exchanger during different engine operating conditions. In FIGS. 2A-2D, the ejector is housed in the exhaust bypass assembly upstream of the heat exchanger to enable flow of exhaust and heated intake air through the heat exchanger during different engine operating conditions. An engine controller may be configured to perform a control routine, such as the example routines of FIGS. 3 and 4, to vary the flow of exhaust gas and heated intake air through the heat exchanger in the systems of FIGS. 1A-1B and 2A-2D. The different modes of operation of the exhaust bypass assembly are tabulated at FIG. 5. An example operation of the exhaust bypass assembly is shown with reference to FIG. 6.

FIGS. 1A-1B schematically show aspects of a first embodiment of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. A throttle valve 19 may be placed in the intake passage 42 upstream of the air clear 12. The compressor may be any suitable intake-air compressor, such as a motor-driven or driveshaft driven supercharger compressor. In engine system 10, the compressor is a turbocharger compressor mechanically coupled to turbine 116 via a shaft 21, the turbine 116 driven by expanding engine exhaust.

As shown in FIGS. 1A-1B, compressor 114 is coupled, through charge-air cooler (CAC) 17 to throttle valve 20. Throttle valve 20 is coupled to engine intake manifold 22. From the compressor, the compressed air charge flows through the charge-air cooler 17 and the throttle valve to the intake manifold. In the embodiment shown in FIGS. 1A-1B, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate valve 91 may be actuated open to dump at least some exhaust pressure from upstream of the turbine to a location downstream of the turbine via wastegate 90. By reducing exhaust pressure upstream of the turbine, turbine speed can be reduced, which in turn helps to reduce boost and also address compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIGS. 1A-1B, exhaust from the one or more exhaust manifold sections is directed to turbine 116 to drive the turbine. The combined flow from the turbine and the wastegate then flows through emission control device 170 housed in the main exhaust passage 102. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. In the present example, emission control device 170 may also be referred to as an exhaust catalyst. All or part of the treated exhaust from emission control device 170 may be released into the atmosphere via tailpipe 35 after passing through a muffler 172.

A first intake passage 188 may couple the intake passage 42 to the tailpipe 35 via an ejector 128. A first end of the first intake passage 188 may be coupled to the intake passage 42 between the compressor 114 and the cooler 17 (upstream of the compressor 114 and downstream of the cooler 17) and a second end of the first intake passage 188 may lead to a motive inlet of the ejector 128. A first valve 94 may regulate flow of air via the first intake passage 188.

An exhaust bypass assembly 160 including a bypass passage 122 may be coupled to the main exhaust passage 102, downstream of the emission control device 170. The bypass assembly 160 may extend from downstream of the emission control device 170 to upstream of muffler 172. In this way, emission control device 170 and muffler 172 may be coupled via each of the main exhaust passage and bypass passage 122.

An inlet 120 of the exhaust bypass assembly 160 may be coupled to main exhaust passage 102 at junction 119 (downstream from emission control device 170). The inlet 120 leads to the bypass passage 122 which is parallel to the main exhaust passage 102. A heat exchanger may be positioned in the bypass passage 122. A coolant may be circulated through the heat exchanger 110 for effective cooling of exhaust passing through it, the circulating coolant fluidically coupling the heat exchanger to a cooling system of the engine. In particular, the circulating coolant may absorb heat at the heat exchanger and then release the absorbed heat upon passage through a heater core (to enable cabin heating) and/or a cylinder head (to enable engine heating).

In the first embodiment, the ejector 128 may be positioned downstream of the heat exchanger, at the junction of the exhaust bypass passage 122 and the first intake passage 188 with the suction inlet of the ejector coupled to the exhaust bypass. The motive inlet of the ejector may be coupled to intake passage 188 and the motive outlet of the ejector 128 may be coupled to the exhaust bypass assembly, upstream of muffler 172. As a result of this configuration, air flowing through the first intake passage 188, from the intake manifold 22, flows into the motive inlet, then via the ejector 128 to the tailpipe. The flow of fresh air through the ejector 128 to the tailpipe 35 creates a low pressure region (and thereby vacuum) at the neck of the ejector 128. This low pressure may be used to draw exhaust from main exhaust passage 102 into the suction inlet of ejector 128. Since the heat exchanger 110 is positioned upstream of the suction inlet of the ejector 128, flow of exhaust into the ejector 128 passes through the heat exchanger 110. In this way the ejector 128 may be used as diverter valve. The exhaust drawn into the ejector may then be released to the tailpipe through junction 127. Since all components of the exhaust bypass assembly are located downstream of the emissions control device (including catalyst) 170, exhaust reaching the bypass assembly may have already been used for catalyst warm-up (especially during cold-start conditions), therefore the entire exhaust heat reaching the heat exchanger may be utilized for heating vehicle components.

The engine system further includes an exhaust gas recirculation (EGR) system for recirculating exhaust from downstream of the exhaust catalyst 170 to the intake manifold 22, downstream and/or upstream of the compressor 114. An EGR passage is coupled to the bypass passage 122, downstream of the heat exchanger 110 and upstream of the ejector 128. The EGR passage comprises a first branch (first EGR delivery passage) 182 for delivering EGR to the intake manifold 22 downstream of the compressor 114 and downstream of throttle 20; and a second branch (second EGR delivery passage) 184 for delivering EGR to the intake manifold 22 upstream of the compressor 114. A first EGR valve 96 may be coupled to the first branch 182 and a second valve 92 may be coupled to the second branch 184. During conditions when EGR is required, EGR valves 96, and 92 may be opened to draw in exhaust from downstream of the catalyst into the EGR passage 180 via the heat exchanger 110, while bypassing the ejector 128. During these conditions, the heat exchanger 110 may be operated as an EGR cooler, obviating the need for a dedicated EGR cooler.

Valves 94 and 92 may be opened to admit a controlled amount of exhaust to the compressor outlet and inlet respectively for desirable combustion, compressor performance, and emissions control. Each of the valves 94, 92, and 96 may be configured as a continuously variable valve. In an alternate example, however, the valves 94, 92, and 96 may be configured as an on/off valve. By adjusting the position of the valves 94, 92, and 96 based on engine operating conditions, flow of exhaust through the heat exchanger may be varied. For example, a first amount of EGR may be delivered to the engine downstream of the compressor 114 via first passage 96 and a second amount of EGR may be delivered to the engine upstream of the compressor 114 via second passage 92, a ratio of the first amount to the second amount adjusted based on engine operating conditions and compressor operation. As an example, during conditions when the compressor is operating within a threshold distance of its surge limit, the first amount may be decreased while the second amount is increased. As another example, during conditions when higher boost is desired for engine operations, the first amount may be increased while the second amount is decreased. In further embodiments, the engine system may include a high pressure EGR flow path wherein exhaust is drawn from upstream of turbine 116 and recirculated to the engine intake manifold, downstream of compressor 114.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 125 located upstream of the emission control device, MAP sensor 124, exhaust temperature sensor 130, exhaust pressure sensor 129, compressor inlet temperature sensor 55, compressor inlet pressure sensor 56, compressor inlet humidity sensor 57, and EGR sensor. Other sensors such as additional pressure, temperature, air/fuel ratio, and composition sensors may be coupled to various locations in engine system 100. The actuators 81 may include, for example, throttles 19 and 20, EGR valves 96, and 92, first valve 94, wastegate 91, and fuel injector 66. The control system 14 may include a controller 12. The controller 12 may receive input data from the various sensors, process the input data, and trigger various actuators in response to the processed input data based on instruction or code programmed therein corresponding to one or more routines. For example, based on engine operating conditions and EGR requirements the controller 12 may regulate the openings of the EGR valves 96, and 92 to flow cooled EGR from the main exhaust passage 102 to the engine intake manifold both downstream and upstream of the compressor via the exhaust bypass assembly 160. As another example, based on catalyst temperature inferred from exhaust temperature sensor 130, an opening of the first valve 94 may be adjusted to route fresh air through the ejector 128 thereby creating a low pressure area across the heat exchanger 110 which in turn facilitates flow of hot exhaust through the heat exchanger wherein exhaust heat may be recovered. An example control routine is described with regard to FIGS. 3, and 4.

A first mode of operation of the exhaust bypass assembly 160 is shown in FIG. 1A. The first operating mode may represent a first setting of the valves 94, 92, and 96 that enables exhaust heat recovery at the heat exchanger. The first operating mode may be selected during cold-start conditions when demand for cabin heating and/or engine heating is higher. Cold-start conditions may be inferred from exhaust temperature or catalyst temperature as estimated by the exhaust temperature sensor 130. In the first operating mode, the first valve 94 is in the open position. A degree of opening of the first valve 94 may be adjusted based on one or more of turbine speed, boost demand, and operator cabin heating demand. As an example, the opening of the first valve 94 may be increased as turbine speed increases, engine boost demand increases, and cabin heating demand increases. Also, the wastegate valve 91 is maintained in a closed position while operating in the first mode. Due to the closure of the wastegate valve 91, exhaust is routed through the turbine 116 which spins up the turbine and generates a boost pressure at the compressor 114 outlet. In this way, by closing the waste gate valve during cold-start conditions, turbine spin-up can be expedited, and boosted intake air may be provided earlier during engine operation. By spinning the turbine during a cold-start, delays in turbine spin-up (turbo lag), and thereby delays in providing a demanded boost pressure may be reduced. A portion of the boosted fresh air may be routed to ejector 128 via the first intake passage 188 by adjusting the opening of first valve 94. The fresh air may be routed from the ejector to the muffler 172 and the tailpipe 35. Solid arrows show the flow path of the fresh air from the compressor 114 outlet to the tailpipe via the ejector 128.

Motive flow of fresh air through the ejector creates a low pressure area at the ejector suction inlet, exhaust bypass passage 122, and the heat exchanger 110. Due to the low pressure region, hot exhaust flowing through the main exhaust passage 102 may be drawn into the exhaust bypass assembly 160. The hot exhaust may then flow via the bypass passage 122 and through the heat exchanger 110 to tailpipe 35. Dotted lines show the flow path of exhaust through the bypass passage 122. At the heat exchanger 110, the exhaust may be cooled and the heat from the exhaust may be transferred to a coolant circulating through the heat exchanger 110. The coolant with the heat recovered from the exhaust may be circulated back to the engine (under conditions when engine heating is required) and/or circulated through a heater core of the vehicle and thereafter the recovered heat may be utilized for functions such as warming the passenger cabin, thereby improving engine efficiency. For example, air drawn into the cabin may be heated upon passage through the heater core. During cold-start conditions, EGR may not be desired for engine operations. Therefore, in the first operating mode, the EGR valves 96, and 92 may be maintained in closed position thereby disabling exhaust from flowing towards the intake manifold 22. In this way, during cold-start conditions, by utilizing motive flow via the ejector, hot exhaust may be routed through the heat exchanger (for exhaust heat recovery) without the requirement of any diverter valve.

In an alternate example of the first embodiment, the first intake passage 188 may be positioned downstream of the charge air cooler (CAC) 17. As a result, condensate accumulated in the charge air cooler may be purged via the first intake passage 188. Therein, the first mode of operation may be selected responsive to an estimated condensate level at the CAC. During operation in the first mode, condensate accumulating in the CAC 17 may be purged by flowing the condensate together with the boosted fresh air to the tailpipe 35 via the bypass passage 122 while generating vacuum at the ejector for use in drawing in exhaust through the heat exchanger 110. In this way, by purging the condensate to the tailpipe and not to the engine intake manifold, occurrence of engine misfire events may be reduced.

A second mode of operation of the exhaust bypass assembly 160 is shown in FIG. 1B. The second operating mode may represent a second setting of the valves 94, 92, and 96 that enables EGR cooling at the heat exchanger. The second operating mode may be selected once the engine is warmer and engine heating or cabin heating demand is lower. At this time, EGR may be desired for engine operations. In the second operating mode, the first valve 94 may be maintained in an open position with a smaller opening in order to route a smaller portion of the boosted fresh air to ejector 128 via the first intake passage 188. Alternatively, in the second mode the first valve 94 may be actuated to a closed position to suspend motive flow via the ejector. As a result of the motive flow through the ejector, exhaust gas may be drawn in to the heat exchanger in the bypass passage from the main exhaust passage, and the cooled exhaust gas can then be recirculated to the engine intake. Additionally, at least some hot exhaust gas may be drawn from the main exhaust passage into the EGR passage bypassing the heat exchanger. However, by adjusting the opening of valve 94 and allowing a small amount of boost pressure to be leaked, the proportion of exhaust drawn into the bypass and through the heat exchanger may be increased, improving exhaust heat recovery.

The openings of the EGR valves 96, and 92 may be adjusted to regulate the flow of exhaust through each of the first EGR delivery passage 182 and the second EGR delivery passage 184. The ratio of the EGR delivered downstream of the compressor 114 (via first EGR delivery passage 182) and EGR delivered upstream of the compressor 114 (via second EGR delivery passage 184) may depend, in one example, on the surge limit of the compressor 114. As an example, if the compressor is operating with a pressure ratio closer to (within a threshold distance of) its surge limit, the fraction of EGR delivered downstream of the compressor 114 may be reduced compared to the fraction of EGR delivered upstream of the compressor 114. The ratio of EGR delivered downstream and upstream of the compressor 114 may further depend on EGR temperature. Under conditions when the EGR is cooler, a larger fraction of EGR may be delivered downstream of the compressor 114 and CAC 17 in order to reduce condensation occurring at the CAC 17. The ratio of the EGR delivered downstream of the compressor 114 (via first EGR delivery passage 182) and EGR delivered upstream of the compressor 114 (via second EGR delivery passage 184) may further depend on available pressure causing EGR flow, engine speed, engine load, and/or desired boost pressure. As an example, if one or more of engine load, engine speed, and desired boost pressure increases, a larger fraction of EGR may be delivered downstream of the compressor 114 for increased engine performance. By using valve 96 as a compressor bypass valve for delivering cooled EGR upstream of the compressor 114, any undesirable noise produced due to compressor 118 surge (caused by rapid closing of throttle 20) may be reduced. The choice of where to add the exhaust to the inlet air stream (through 96 or through 92) may depend in part on the available pressure to cause an EGR flow rate. As a result, valve 94 (or 96) may be operated like a compressor bypass valve while reducing the squawk noise that occurs responsive to a rapid closing of throttle 20 which can drive the compressor 114 into surge. Dashed lines show the flow path of exhaust from the main exhaust passage 102 to the intake manifold 22 via the EGR delivery passage 180 and the first EGR delivery passage 182 and solid lines show the flow path from the EGR delivery passage 180 to the engine intake passage 42 via the second EGR delivery passage 184.

Due to the opening of the EGR valves 96, and 92, hot exhaust flowing through the main exhaust passage 102 may be routed into the exhaust bypass assembly 160 through junction 119. By maintaining the first valve 94 in an open position (with a smaller opening), a smaller portion of boosted fresh air may be routed through the ejector 128, thereby creating a low pressure across the ejector 128. The low pressure across the ejector may facilitate routing of the hot exhaust from the main exhaust passage 102 into the bypass passage 122. Also, due to the flow of boosted air from the intake manifold to the tailpipe 35 via the ejector 128, hot exhaust may not enter the bypass assembly 160 via the outlet 126, therefore the entire volume of hot exhaust may be routed to enter via the inlet 120 and then pass through the heat exchanger 110 before being delivered as cooled EGR (entire volume of EGR will be cooled). In this way, the ejector 128 may be utilized as a fluidic valve used for reducing flow of hot exhaust into the bypass assembly 160 via the outlet 126. Since the EGR passages are coupled upstream of the heat exchanger, while the ejector is coupled downstream of the heat exchanger, hot exhaust may flow via the bypass passage 122 and through the heat exchanger 110 into the EGR passage, without flowing through the ejector. At the heat exchanger 110, the exhaust may be cooled before the exhaust is delivered to the engine intake. Heat recovered from the exhaust may be transferred to a coolant circulating through the heat exchanger 110. Heat recovered at the heat exchanger 110 may be utilized for cabin heating and/or cylinder head heating purposes. Under circumstances when the heat recovered at the heat exchanger 110 is not required for heating vehicle components, the heat may be transferred to the radiator for dissipation to atmosphere. In this way, based on demand and compressor 114 operation, cooled EGR may be delivered to the engine intake manifold both downstream and upstream of the compressor upon passage through the heat exchanger being used as an EGR cooler.

In another example, a third operating mode (not depicted) of the exhaust bypass assembly 160 may represent a third setting of the valves 94, 92, and 96 where exhaust flow through the heat exchanger is disabled. The third operating mode may be selected when neither EGR nor exhaust heat recovery is desired such as during high engine speed and/or engine load conditions. In the third operating mode, each of the three valves 94, 96, and 92 may be maintained in a closed position. Due to the position of the valves, exhaust flowing through the main exhaust passage 102 may not enter the exhaust bypass assembly 160 and may directly flow downstream towards the muffler 172 and the tailpipe 35. Consequently, in this mode, heat from the exhaust may not be recovered at the heat exchanger 110.

In this way, based on engine operating conditions, exhaust may be routed through the exhaust bypass assembly 160 without the requirement of any diverter valve. Motive flow via the ejector coupled to the exhaust bypass assembly 160 may be utilized to divert exhaust through the heat exchanger even during cold-start conditions facilitating exhaust heat recovery. The recovered exhaust heat may be utilized for passenger cabin and/or cylinder head heating purposes.

Detailed description of the operation of exhaust bypass assembly 160 will be discussed with relation to FIGS. 3, 4, 5, and 6.

Moving on to FIGS. 2A-2D, a second embodiment of engine system 100 is shown. Components previously introduced in FIGS. 1A-1B are numbered similarly and not reintroduced. Similar to the embodiment of FIGS. 1A-1B, engine system 200 of FIGS. 2A-2D may include control system 14 for controlling engine operations, and an exhaust bypass assembly 260 coupled to the main exhaust passage 102, downstream of emission control device 170.

In the depicted embodiment, first intake passage 288 may couple the intake passage 42, downstream of the compressor and upstream of the charge air cooler, to the tailpipe 35 via ejector 128. In particular, first intake passage 288 is coupled to the tailpipe via exhaust bypass 222. A first valve 294 may regulate flow of air via the first intake passage 188. However, in this embodiment, ejector 128 is coupled upstream of the heat exchanger 210 in bypass passage 260. As a result, intake air flowing from the intake passage to the tailpipe via passage 188 passes first through the ejector, then through the heat exchanger before reaching the tailpipe.

An exhaust bypass assembly 260 including a bypass passage 222 may be coupled to the main exhaust passage 102, downstream of the emission control device 170. The bypass assembly 160 may extend from downstream of the emission control device 170 to upstream of muffler 172.

An inlet 220 of the exhaust bypass assembly 160 may be disposed on the main exhaust passage 102 at junction 219 (downstream from emission control device 170). The inlet 220 may lead to a suction inlet of the ejector 220. The ejector 228 may be positioned at the junction of an exhaust bypass passage 122 and the first intake passage 188. The bypass passage 222 may be parallel to the main exhaust passage 102. In the second embodiment, a heat exchanger 210 may be coupled to the exhaust bypass passage 122 downstream of the motive outlet of the ejector 128. A coolant may be circulated through the heat exchanger 110 for effective cooling of exhaust passing through it, the circulating coolant fluidically coupling the heat exchanger to a cooling system of the engine. As an example, the heat absorbed at the circulating coolant may be used for cabin heating and/or cylinder head heating purposes.

Downstream of the heat exchanger 210, an outlet 226 may couple the exhaust assembly to the exhaust passage 102 at a junction 227 located downstream from the junction 219, and upstream of muffler 172.

As the motive inlet of ejector is coupled to the first intake passage 288, air flowing through the first intake passage 288, from the intake manifold 22 to the tailpipe 35, flows via the ejector 228. When there is flow of fresh air from the motive inlet of the ejector 228 to the tailpipe 35 via motive outlet, a low pressure region may be created at the ejector 228. This low pressure may be used to draw exhaust from main exhaust passage 102 into suction inlet of ejector 220 and from there on to the tailpipe 35 via the exhaust bypass passage 222. Since the heat exchanger 210 is positioned downstream of the suction inlet of the ejector 228, flow of exhaust from the ejector 228 to the tailpipe 35 passes through the heat exchanger 210. In this way the ejector 228 may be used as diverter valve.

After passing through the ejector 228 and the heat exchanger 210, the exhaust may flow out of the bypass assembly 260 at junction 227. After passing through the muffler 172, the exhaust may be released to the atmosphere through a tailpipe 35.

The engine includes an exhaust gas recirculation (EGR) system for recirculating exhaust from downstream of the exhaust catalyst 170 to the intake manifold 22, downstream and upstream of the compressor 114. An EGR passage is coupled to the bypass passage 122, downstream of the heat exchanger 110 and upstream of the outlet 226. The EGR passage comprises a first branch (first EGR delivery passage) 282 for delivering EGR to the intake manifold 22 downstream of the compressor 114 and throttle 20 and a second branch (second EGR delivery passage) 284 for delivering EGR to the intake manifold 22 upstream of the compressor 114. A first EGR valve 296 may be coupled to the first branch 282 and a second valve 292 may be coupled to the second branch 284. During conditions when EGR is required, EGR valves 296, and 292 may be opened to drawn exhaust from downstream of the catalyst into the EGR passage 180 via the ejector 228 and the heat exchanger 110. During such conditions, the heat exchanger 110 may be utilized for EGR cooling.

By adjusting the position of the valves 294, 292, and 296 based on engine operating conditions, flow of exhaust through the ejector and the heat exchanger may be varied. A first amount of EGR may be delivered to the engine downstream of the compressor 114 via the first intake passage 296 and a second amount of EGR may be delivered to the engine upstream of the compressor 114 via second passage 292. As discussed in relation to FIG. 1A, a ratio of the first amount to the second amount may be adjusted based on engine operating conditions and compressor operation.

Figure 2A:
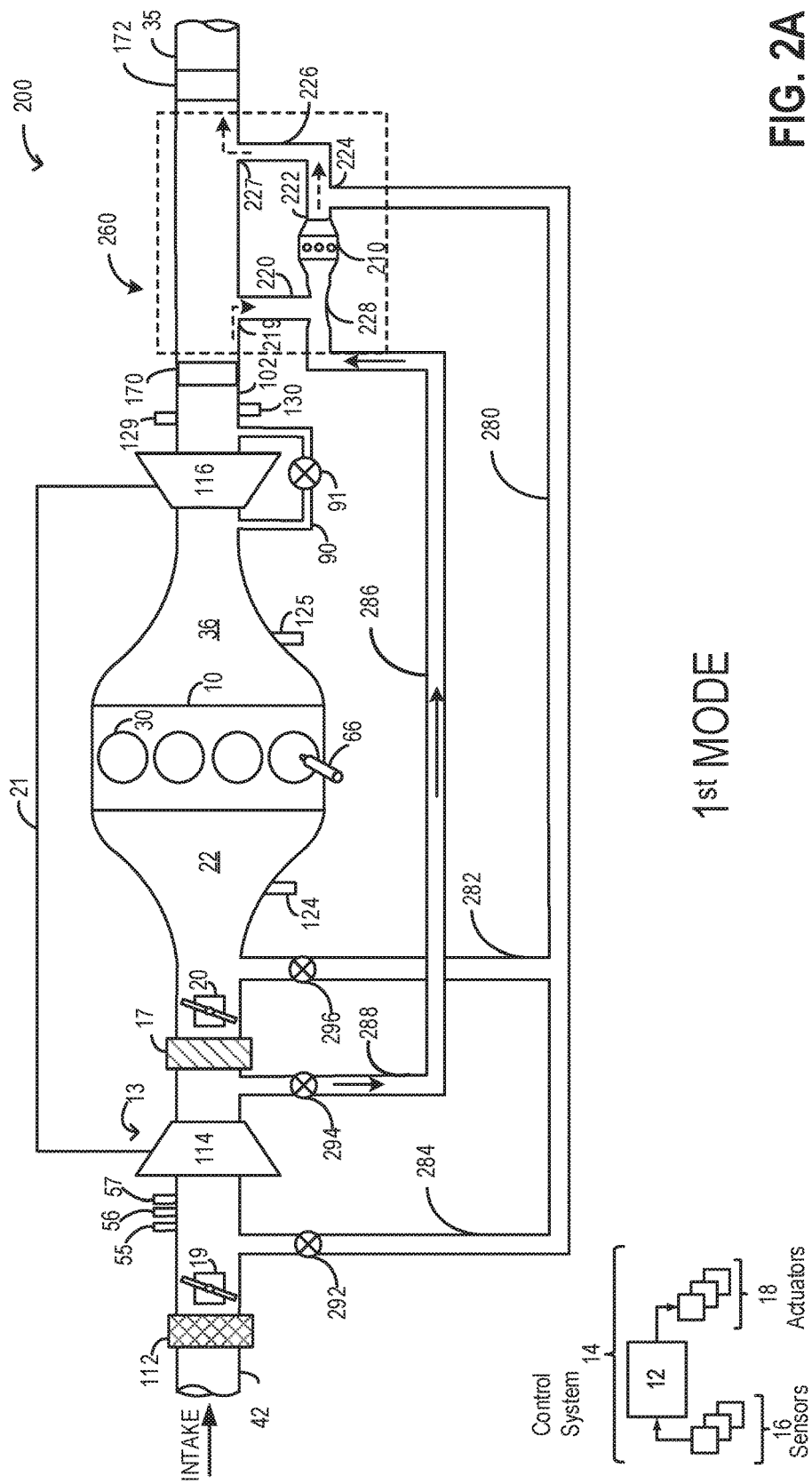

A first mode of operation of the exhaust bypass assembly 260 is shown in FIG. 2A. The first operating mode may represent a first setting of the valves 294, 292, and 296 that enables exhaust flow control via the bypass assembly 260. The first operating mode may be selected during cold-start conditions when demand for cabin heating and/or engine heating is higher. In the first operating mode, the first valve 294 is in the open position. A degree of opening the first valve 294 may be adjusted based on one or more of turbine speed, boost demand, and operator cabin heating demand. Also, the wastegate valve 91 may be maintained in closed position while operating in the first mode. Due to the closure of the wastegate valve 91, exhaust is routed through the turbine 116 which spins up the turbine and generates a boost pressure at the compressor 114 outlet. In this way, by closing the waste gate valve during cold-start conditions, turbine spin-up can be expedited, and boosted intake air may be provided earlier during engine operation. A portion of the boosted fresh air may enter the first intake passage 288 via the first valve 294. The fresh air may be routed to the ejector 228 via the first intake passage 288. The fresh air may then exit the ejector and flow through the outlet 126 towards the muffler 172 and the tailpipe 35. Solid arrows show the flowpath of the fresh air from the compressor 114 outlet to the ejector 228.

When the fresh air passes through the ejector 228, the motive flow generates a low pressure area at the ejector suction inlet, the bypass passage 222, and the heat exchanger 210. Due to the low pressure region, a portion of hot exhaust flowing through the main exhaust passage 102 may be drawn into exhaust bypass passage 222 and then through the heat exchanger 210 to tailpipe 35. Dotted lines show the flow path of exhaust via the bypass passage 222. At the heat exchanger 210, the exhaust may be cooled and the heat from the exhaust may be transferred to a coolant circulating through the heat exchanger 210. The coolant with the heat recovered from the exhaust may be circulated through a heater core of the vehicle and thereafter the recovered heat may be utilized for functions such as heating the passenger cabin, thereby improving engine efficiency.

During cold-start conditions, EGR may not be desired for engine operations. Therefore, in the first operating mode, the EGR valves 296, and 292 may be maintained in closed position thereby disabling exhaust from flowing towards the intake manifold 22. In this way, during cold-start conditions, hot exhaust may be routed through the heat exchanger (for exhaust heat recovery) without the requirement of any diverter valve.

In an alternate example of the second embodiment, the first intake passage 288 may be positioned downstream of the charge air cooler (CAC) 17. As a result, during operation in the first mode, condensate accumulating in the CAC 17 may be purged by flowing the condensate together with the boosted fresh air to the tailpipe 35 via the bypass passage 222.

A second mode of operation of the exhaust bypass assembly 260 is shown in FIG. 2B. The second operating mode may represent a second setting of the valves 294, 292, and 296 that enables EGR cooling. The second operating mode may be selected once the engine is warmer and engine heating or cabin heating demand is lower. At this stage, EGR may be desired for engine operations. In the second operating mode, the first valve 294 may be maintained in an open position with a smaller opening in order to route a smaller portion of the boosted fresh air to ejector 228 via the first intake passage 288. Alternatively, in the second mode the first valve 294 may be in closed position to suspend motive flow of fresh air via the ejector. The openings of the EGR valves 296, and 292 may be adjusted to regulate the flow of exhaust through each of the first EGR delivery passage 282 and the second EGR delivery pipe 284. In one example, the ratio of the EGR delivered downstream of the compressor 114 (via first EGR delivery passage 182) and EGR delivered upstream of the compressor 116 (via second EGR delivery passage 184) may be adjusted based on the surge limit of the compressor 114. As an example, if the compressor is operating with a pressure ratio closer to its surge limit, the fraction of EGR delivered downstream of the compressor 114 may be reduced compared to the fraction of EGR delivered upstream of the compressor 114. Dashed lines show the flow path of exhaust from the main exhaust passage 102 to the intake manifold 22 via the EGR delivery passage 280 and the first EGR delivery passage 282 and solid lines show the flowpath from the EGR delivery passage 280 to the engine intake passage 42 via the second EGR delivery passage 284.

Due to the opening of the EGR valves 296, and 292, hot exhaust flowing through the main exhaust passage 102 may be routed to enter the inlet 120 of the exhaust bypass assembly 260 at junction 219. By maintaining the first valve 294 in an open position (with a smaller opening), a smaller portion of boosted fresh air may be routed through the ejector 228, thereby creating a low pressure across the ejector 228. The low pressure across the ejector may further facilitate the routing of hot exhaust from the main exhaust passage 202 into the bypass passage 222. In this way, the entire volume of hot exhaust may enter the bypass passage 222 via the inlet 220 and not via the outlet 226 (exhaust entering via outlet would not have been cooled). In this operating mode, the hot exhaust may then flow via the ejector 228, the bypass passage 122, and the heat exchanger 210 before entering the EGR delivery passage 280. At the ejector 228, a smaller portion of the boosted fresh air (passing through the ejector 228) may mix with the hot exhaust entering the bypass assembly 260. At the heat exchanger 210, the exhaust may be cooled and the heat from the exhaust may be transferred to a coolant circulating through the heat exchanger 210. Heat recovered at the heat exchanger 210 may be utilized for cabin heating and/or cylinder head heating purposes. Under circumstances when the heat recovered at the heat exchanger 110 is not required for heating vehicle components, the heat may be transferred to the radiator for dissipation to atmosphere. After exiting the heat exchanger 210, the cooled exhaust may enter the EGR delivery passage 280 and from there on the EGR may flow to the engine intake manifold 22.

In the second mode, a portion of the exhaust gas will be drawn through the cooler 210 and a portion will be sourced directly through 226. This means that EGR cooling may be not be as effective as desired. If this is the case, the option of partially or fully opening valve 294 allows all the EGR gas to be cooled, albeit somewhat diluted with air.

A third mode of operation of the exhaust bypass assembly 260 is shown in FIG. 2C. The third operating mode may represent a third setting of the valves 294, 292, and 296 that enables intake air heating. The third operating mode may be selected when EGR is not desired and hot intake air (charge air) is desired for engine operations. Intake air heating may be desirable at low intake manifold pressure as it lowers pumping loss and raises charge temperature at ignition which promotes reliable combustion at light air charge. At light air charge (that is lighter engine loads) heating of the air charge is favorable. In the third operating mode, the first valve 294 and the first EGR valve 296 may be opened while the second EGR valve 292 may be maintained in closed position.

Due to the opening of the first valve 294, boosted fresh air may enter the first intake passage 288 from downstream of the compressor 114 and may flow to the ejector 228 via the first intake passage 188. The fresh air may then flow through the heat exchanger 210 wherein heat from the circulating coolant may be transferred to the fresh air thereby increasing the air temperature. As the first EGR valve 296 is in the open position, a larger portion (first portion) of the heated air may enter the EGR passage 280 at junction 224 and from there on the heated air may then be delivered to the engine intake manifold 22 via the first EGR delivery passage 282. In this way, intake air may bypass the cooler 17, reducing heat loss at the intake manifold. Further, the intake air may receive additional heat at the heat exchanger 210. Solid arrows show the flow path of the intake air flowing through the first intake passage 288 and the first EGR delivery passage 282.

A smaller portion (second portion) of the heated air exiting the heat exchanger 210 may exit the exhaust bypass assembly via the outlet 226 and may flow to the tailpipe 35. A portion of exhaust entering the exhaust bypass assembly via the inlet 220 due to motive flow of fresh air through the ejector 228 may also mix with the heated intake air. It will be appreciated that even if a small portion of exhaust gas is picked up from the main exhaust passage during the recirculating of the heated intake air, the larger intake air heating benefit may outweigh the (smaller, undesired) EGR effect at light load.

Figure 2D:
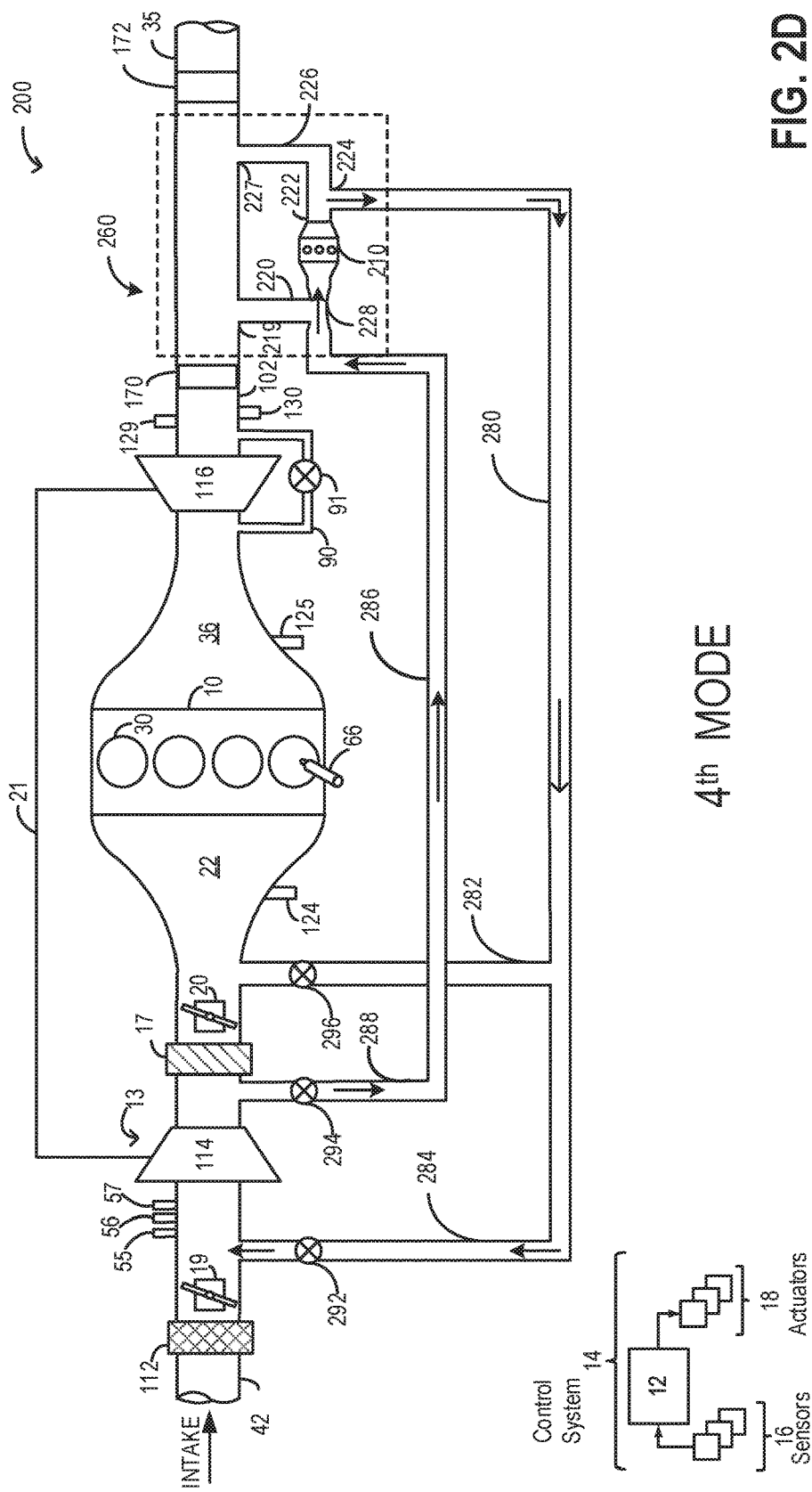

A fourth mode of operation of the exhaust bypass assembly 260 is shown in FIG. 2D. The fourth operating mode may represent a fourth setting of the valves 294, 292, and 296 that enables recirculation of boosted intake air bypassing the compressor 114. The fourth operating mode may be selected when post-compressor pressure relief is desired due to rapid throttle closure. As an example, such a condition may occur during a tip-out from boosted conditions and the compressor bypass flow may be desired to improve air flow across the compressor and for moving the compressor pressure ratio away from a surge limit. In the fourth operating mode, the first valve 294 and the second EGR valve 292 may be opened while the first EGR valve 296 may be maintained in closed position. By opening the first valve, boost pressure may be dumped allowing for substantially immediate post-compressor pressure relief. Also, the wastegate valve 91 may be concurrently opened to route exhaust directly towards the tailpipe 35 bypassing the turbine 116. Due to a larger amount of exhaust bypassing the turbine, the turbine 116 speed may decrease and consequently the compressor 114 speed may also decrease, further assisting in boost pressure relief. As a result of coordinating the first valve opening with the opening of EGR valve 292, boost pressure may be recirculated from the compressor outlet to the inlet via use the first passage 288 and the EGR passage 284, enabling a compressor pressure ratio to be shifted away from the surge limit Due to the opening of the first valve 294, boosted air may enter the first intake passage 288 from downstream of the compressor 114 and may flow to the ejector 228 via the first intake passage 288. The fresh air may then flow through the ejector 228 generating a low pressure area at the ejector suction inlet, the bypass passage 222, and the heat exchanger 210. After passing through the bypass passage 222 with the heat exchanger 210, due to the opening of the second EGR valve 292, a larger portion (first portion) of the boosted air may enter the EGR passage 280 at junction 224 and from there on the recirculated air may then be delivered to the intake passage 42 via the second EGR delivery passage 282. Also, due to the low pressure region, a portion of hot exhaust flowing through the main exhaust passage 102 may be drawn into exhaust bypass passage 222 and then through the heat exchanger 210 to tailpipe 35. At the heat exchanger 210, the exhaust may be cooled and the heat from the exhaust may be utilized for providing heat to a plurality of vehicle components. Therefore, by opening each of the first valve 294 and the second EGR valve 292, post-compressor pressure may be relieved while creating a low pressure region at the ejector for improved exhaust heat recovery. In this way, the first valve 194 may be used as a compressor bypass valve, thereby reducing the need for a dedicated bypass valve.

A smaller portion (second portion) of the boosted air exiting the heat exchanger 210 may exit the exhaust bypass assembly via the outlet 226 and may flow to the tailpipe 35. A portion of exhaust entering the exhaust bypass assembly via the inlet 220 due to motive flow of fresh air through the ejector 228 may also mix with the heated intake air. It will be appreciated that even if a small portion of exhaust gas is picked up from the main exhaust passage during the recirculating of the heated intake air, the compressor pressure relief benefit may outweigh the (smaller, undesired) EGR effect at light load.

In another example, a fifth operating mode (not depicted) of the exhaust bypass assembly 160 may represent a fifth setting of the valves 294, 292, and 296 that enables exhaust flow control. The fifth operating mode may be selected when neither EGR nor heated charge air is desired for engine operations. This may be during high engine speed and/or engine load conditions. In the fifth operating mode, each of the three valves 94, 96, and 92 are maintained in closed positions. Due to the position of the valves, the exhaust flowing through the main exhaust passage 102 may not enter the exhaust bypass assembly 260 and may directly flow downstream towards the muffler 172 and the tailpipe 35. Consequently, in this operating mode, heat from the first portion of exhaust may not be recovered at the heat exchanger 110.

In this way, based on engine operating conditions, exhaust may be routed through the exhaust bypass assembly 260 without the requirement of any diverter valve. Motive flow via the ejector coupled to the exhaust bypass assembly 260 may be utilized to divert exhaust through the heat exchanger even during cold-start conditions facilitating exhaust heat recovery. The first intake passage 288 and the first EGR delivery passage 282 may be used to bypass the cooler 17 and to deliver heated intake air.

FIGS. 1A-1B and 2A-2D show example configurations of an engine system with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, the system of FIGS. 1A-1B and 2A-2D provides for a vehicle system, comprising: a vehicle cabin, an engine intake manifold including an upstream compressor and a downstream charge air cooler, an engine exhaust manifold including an exhaust catalyst and a muffler coupled to each other via each of an exhaust passage and an exhaust bypass, the bypass including a heat exchanger and an ejector, an exhaust turbine upstream of the exhaust catalyst, the turbine driving the compressor, a wastegate passage including a wastegate valve coupled across the exhaust turbine, a coolant system fluidly coupling the heat exchanger to a heater core, a first intake passage including a first valve connecting the engine intake manifold from downstream of the compressor to the exhaust bypass, and an EGR system coupling the exhaust bypass downstream of the heat exchanger to the intake manifold, the EGR system including each of a first EGR passage with a first EGR valve for recirculating exhaust upstream of the compressor and a second EGR passage with a second EGR valve for recirculating exhaust downstream of the charge air cooler. The vehicle system may further comprise a controller with computer readable instructions stored on non-transitory memory for operating in a first mode with the wastegate valve closed and the first valve open to flow air from the intake manifold towards the muffler via the ejector, using low pressure generated across the ejector to route exhaust from downstream of the catalyst into the muffler via the heat exchanger, transferring heat from the exhaust to the coolant system, and circulating heated coolant through the heater core, and operating in a second mode with each of the first valve, the first EGR valve and the second EGR valve open to route exhaust to the engine intake manifold via the heat exchanger, transferring heat from the exhaust to the coolant system, and circulating heater coolant through the heater core.

Figure 3:
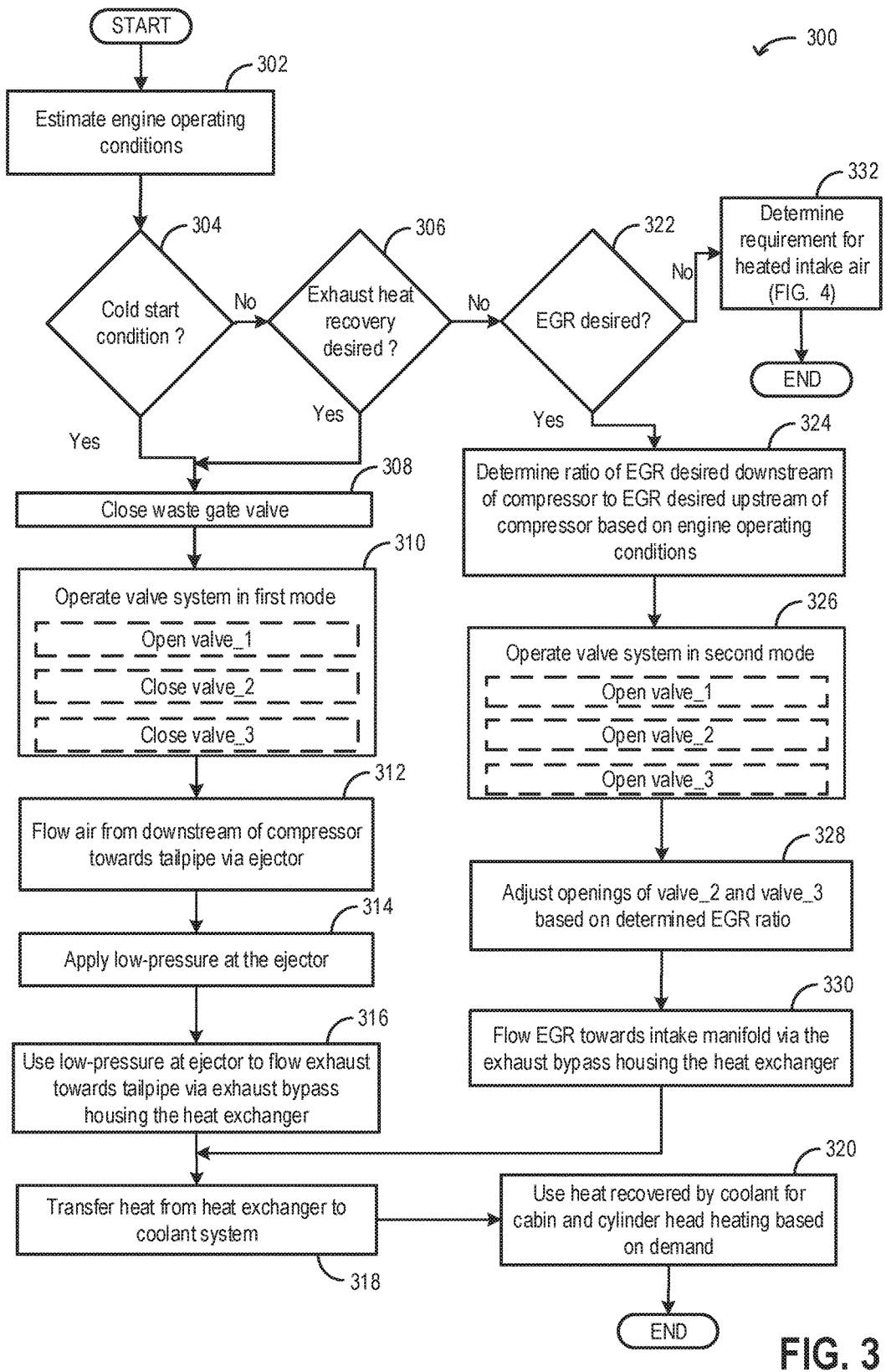
FIG. 3 shows a flow chart illustrating an example method that may be implemented for adjusting exhaust flow through an exhaust bypass assembly.

FIG. 3 illustrates an example method 300 that may be implemented for adjusting exhaust flow through the exhaust bypass assembly and the exhaust gas recirculation (EGR) passages shown in FIGS. 1A-1B and 2A-2D. Instructions for carrying out method 300 and the rest of the methods included herein may be executed by a controller based on instructions stored on a memory of the controller and in conjunction with signals received from sensors of the engine system, such as the sensors described above with reference to FIG. 1A. The controller may employ engine actuators of the engine system to adjust engine operation, according to the methods described below.

At 302, the routine includes estimating and/or measuring current engine operating conditions. Conditions assessed may include, for example, driver demand, engine temperature, engine load, engine speed, manifold air pressure (MAP), manifold air flow (MAF), exhaust pressure, exhaust air/fuel ratio, etc.

At 304, the routine includes determining if the vehicle engine is operating under cold-start conditions. An engine cold-start condition may be confirmed when the engine is started after a prolonged period of engine inactivity, when the engine temperature is lower than a threshold (such as below an exhaust catalyst light-off temperature), and while ambient temperatures are below a threshold.

During cold-start conditions, exhaust gas recirculation (EGR) may not be desired by the engine but exhaust heat recovery may be desired to provide for cabin heating demand. Thus, if engine cold-start conditions are confirmed, the routine moves to 308 in order to operate the valve system (as described in FIGS. 1A-1B, 2A-2D) in the first operating mode. If cold-start conditions are not confirmed, at 306, the routine includes determining if exhaust heat recovery is desired. In one example, exhaust heat recovery may be desired outside of cold-start conditions during high demand for cabin heating. If it is determined that exhaust heat recovery is desired for vehicle operations, the routine also moves on to step 308.

At 308, the waste gate valve may be closed to route exhaust through the turbine coupled to the main exhaust passage. Consequently, the turbine may spin-up and a boost pressure may be available at the compressor outlet.

Operating in the first mode, at 310, as described in relation to FIG. 1A, includes opening a first valve (valve_1) (such as first valve 94 in FIG. 1A) located in the first intake passage coupling the engine intake manifold to the motive inlet of an ejector (such as ejector 128 in FIG. 1A). In addition, since EGR is not desired during the engine cold-start, the EGR valves, valve_2 and valve_3 (such as first EGR valve 96 and second EGR valve 92 in FIG. 1A) may be closed, disabling exhaust flow from the exhaust passage to the engine intake manifold.

A degree of opening the first valve (valve_1) may be adjusted based on one or more of turbine speed, boost demand, and operator cabin heating demand. In one example, the opening of the valve_1 may be increased as turbine speed increases, engine boost demand increases, and cabin heating demand increases. At 312, based on the degree of opening of valve_1, a first portion of the boosted fresh air may be routed through the first intake passage from downstream of compressor outlet to the ejector. Upon passage through the ejector, the fresh air may flow downstream towards the muffler and exit to the atmosphere via the tailpipe. A remaining (second) part of the boosted air not entering the first intake passage may enter the engine intake manifold for combustion.

Due to the motive flow of fresh air through the ejector, at 314, a low pressure area may be created at the ejector, and the heat exchanger. That is, flow of intake air through the ejector may generate ejector vacuum. At 316, this low pressure may be utilized to divert hot exhaust from the main exhaust passage to the tailpipe via the exhaust bypass assembly housing the heat exchanger. That is, the generated ejector vacuum may be applied to the main exhaust passage downstream of the catalyst and used to draw exhaust into the bypass, through the heat exchanger, and then via the ejector to the tailpipe. Since the EGR valves are closed, no exhaust flows through the EGR passage towards the engine intake manifold.

At 318, the exhaust may be cooled at the heat exchanger with heat from the exhaust transferred to a coolant circulating through the heat exchanger. By transferring the heat from the exhaust gas to the coolant, at a location downstream of the exhaust catalyst, exhaust heat remaining after heating the exhaust catalyst can be advantageously used to warm the coolant circulating through the heat exchanger. At 320, the heat recovered from the exhaust gas may be utilized for heating passenger cabin and/or cylinder head based on demand. The coolant warmed via heat transfer at the heat exchanger may be circulated to a heater core so that it can be utilized for heating a vehicle cabin space. In addition, the heat recovered by the coolant may be utilized for heating other components of the vehicle, such as a cylinder head, and an engine block. In case of the cold-start, the vehicle cabin temperature may be low and cabin heating may be required. Thus, based on cabin heating demand, as requested by a vehicle operator (e.g., based on a cabin temperature setting), heat may be transferred from the heater core to the cabin. For example, air may be drawn into the cabin via the heater core, thereby enabling the cabin to be warmed. Likewise, as the cabin heating demand and/or the engine heating demand at the cold start increases, the amount of intake air diverted to the tailpipe via the ejector may be increased so as to increase the portion of exhaust diverted into the bypass and the heat exchanger using ejector vacuum. After meeting the cabin heating demand, the warmed coolant may also be circulated to an engine block and cylinder head to raise engine temperatures, thereby improving engine performance during cold conditions. In addition, after the cabin heating demand is met, the amount of intake air diverted to the tailpipe via the ejector may be decreased.

If it is determined (at 306) that exhaust heat recovery is not desired, at 322, the routine includes determining if cooled EGR is desired for engine operations. In one example, the demand for exhaust heat recovery may drop after engine warm-up. As such, cooled EGR may be desired over a wide range of warmed up engine operating conditions so as to reduce NOx emissions and improve fuel economy. If it is determined that cooled EGR is desired for engine operations, at 324, a ratio of the EGR desired downstream of compressor outlet to EGR desired upstream of compressor inlet may be determined based on engine operating conditions. The EGR ratio may further depend on the pressure ratio of the compressor relative to the compressor's surge limit. As an example, if the compressor is operating with a pressure ratio closer to (within a threshold distance of) the surge limit, the fraction of EGR delivered downstream of the compressor may be reduced compared to the fraction of EGR delivered upstream of the compressor. The ratio of EGR delivered downstream and upstream of the compressor may further depend on EGR temperature and/or EGR humidity. As an example, if the EGR humidity is higher, the fraction of EGR delivered downstream of the charge air cooler may be increased as compared to the fraction of EGR delivered upstream of the compressor. In one example, the controller may retrieve the ratio from a look-up table referenced by engine speed, load, and temperature.

In response to the demand for EGR, at 326, the valve system may be operated in a second mode wherein the opening of valve_1 located in the first intake passage may be decreased compared to the degree of opening in first mode. Each of the two EGR valves (valve_2 located in the first EGR delivery pipe and valve_3 located in the second EGR delivery pipe) may be shifted to open positions. Based on the target EGR ratio (determined at 324), at 328, the method includes adjusting the openings of each of valve_2 and valve_3 to admit a controlled amount of cold exhaust to the intake manifold upstream and downstream of the compressor for desirable combustion and emissions-control performance. For example, the controller may send a signal to actuate respective actuators coupled to valve_1, valve_2, and valve_3, the actuators moving the valve_1 and EGR valves (valve_2 and valve_3) towards the desired open position.

By operating the valve system in the second mode, at 330, the method includes flowing EGR from the main exhaust passage to the intake manifold via the exhaust bypass assembly housing the heat exchanger. Due to the opening of valve-1, a smaller portion of boosted fresh air may flow from the intake manifold to the tailpipe via the ejector, thereby creating a low pressure region across the ejector. Due to the opening of the EGR valves (valve_2 and valve_3), and the low pressure region across the ejector, hot exhaust flowing through the main exhaust passage may be routed to enter the exhaust bypass assembly. The hot exhaust may then flow via the bypass passage housing the heat exchanger. At the heat exchanger the hot exhaust may be cooled. After exiting the heat exchanger, the cooled exhaust may enter the EGR delivery passage. From the EGR delivery passage the cooled exhaust may be delivered to the engine intake manifold downstream of the compressor outlet and to the intake passage upstream of the compressor intake based on the desired EGR ratio.

The routine may then move on to 318, wherein heat from the hot exhaust flowing through the heat exchanger may be transferred to the coolant circulating through the heat exchanger. At 320, heat recovered by the coolant circulating through the heat exchanger may be utilized for cabin heating and/or cylinder head heating. Under circumstances when the heat recovered at the heat exchanger is not required for heating vehicle components, the heat may be transferred to a radiator for dissipation to atmosphere.

If it is determined (at 322) that EGR is not desired for engine operations, the routine moves on to 332 wherein the requirement for heated intake air may be determined. Heated intake air may be routed to the intake manifold bypassing the charge air cooler (such as cooler 17 in FIGS. 2A-2D). Detailed description regarding the valve system operation for heated intake air delivery is provided at FIG. 4.

In this way, by using motive flow via an ejector, heat may be recovered at a heat exchanger from hot exhaust gas during cold-start conditions without the requirement of any diverter valves. Also, based on engine operating conditions and compressor operation, cooled exhaust may be delivered to both downstream and upstream of an intake compressor while using the same heat exchanger as an EGR cooler.

Figure 4:
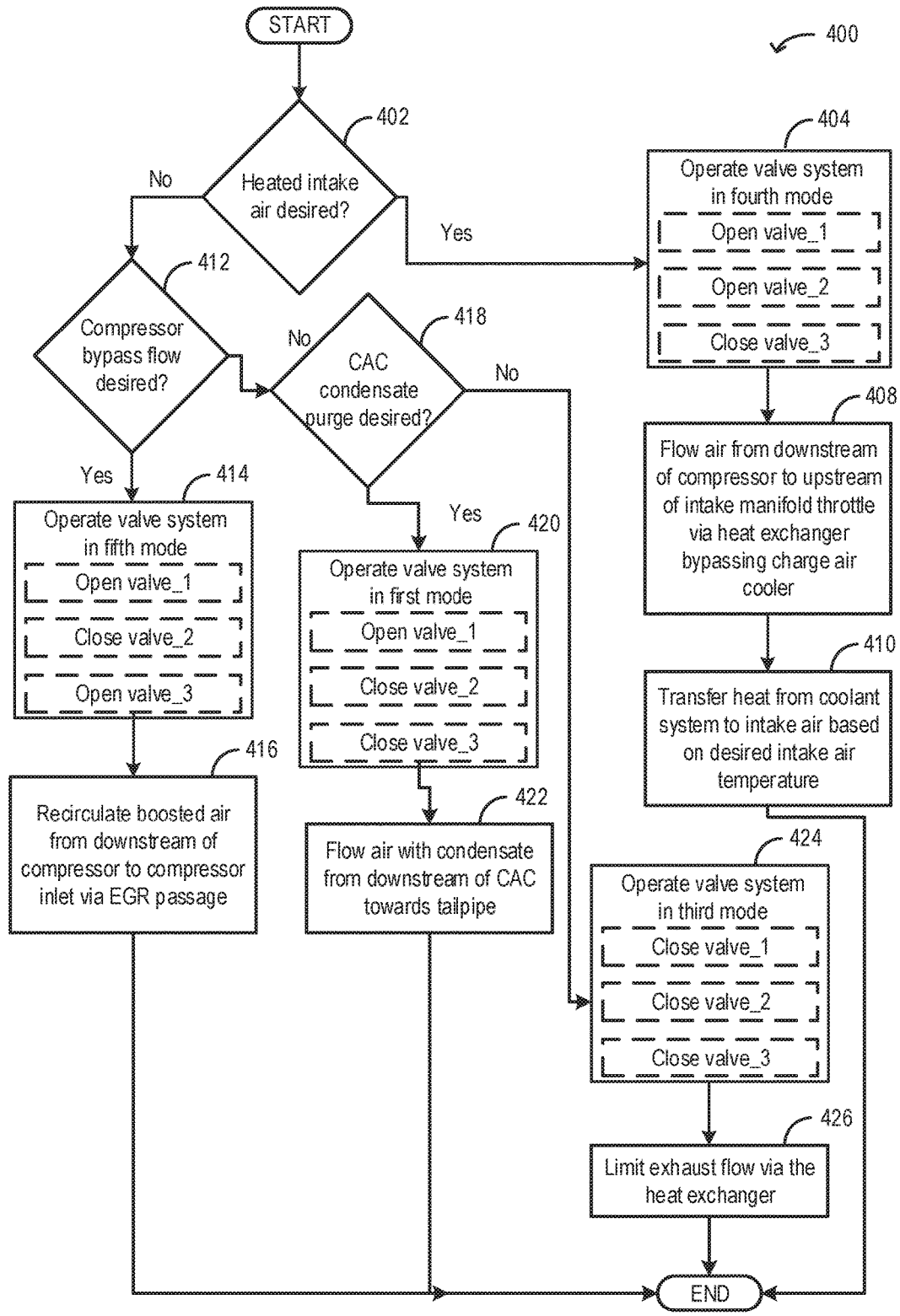
FIG. 4 shows a flow chart illustrating an example method that may be implemented for adjusting air flow through an exhaust bypass assembly during demand for heated intake air.

FIG. 4 shows an example method 400 that may be implemented for adjusting air flow through the exhaust bypass assembly and the EGR system during demand for heated intake air. The method 400 may be carried out as part of the example routine 300 at step 332.

At 402, the routine includes determining if heated intake air is desired for engine operations. Heated intake air may be desired during high engine speed and/or high engine load conditions.

Based on current engine operating conditions, if it is determined that heated intake air is not desired for engine operations, at 412, the routine includes determining if compressor bypass flow is desired.

In one example, compressor bypass flow may be required for post-compressor pressure relief due to sudden throttle closure, such as during a tip-out. Therein the throttle closure to meet the sudden drop in torque demand can result in compressor surge with NVH implications. In still other examples, compressor recirculation flow may be required for boost pressure control. During conditions of surge, boosted air recirculation may be desired to improve flow through the compressor, thereby moving the compressor away from a surge region. Traditionally, this may be achieved by opening a compressor bypass valve that recirculates boosted air from downstream of the compressor to upstream of the compressor via a compressor bypass passage. However, the need for a dedicated bypass passage and bypass valve can also add cost and control complexity due to the rapidly acting bypass valve confounding the wastegate control loop. In addition, frequent cycling of the bypass valve can lead to durability and warranty issues. As elaborated herein, by recirculating the compressed air via an ejector, surge can be addressed using the existing valve system, while also enabling exhaust heat recovery.

If it is determined that compressor bypass flow is desired, at 414, the valve system may be operated in a fifth mode. Operating in the fifth mode includes moving the first valve or valve_1 (such as first valve 294 in FIGS. 2A-2D) located in the first intake passage and the second EGR valve or valve_3 (such as EGR valve 292 in FIGS. 2A-2D) to an open position. Also, the second EGR valve or valve_2 (such as EGR valve 296 in FIGS. 2A-2D) may be actuated to closed position.

A degree of the opening of valve_1 may be adjusted based on the degree of recirculation required (which may be based on a margin to compressor surge). Due to the specific valve configuration, at 416, boosted air may be diverted from downstream of the compressor into the exhaust bypass, and therefore recirculated to the compressor inlet via an EGR passage. While recirculating the compressed air, vacuum may be advantageously generated at the ejector and used for drawing in exhaust, allowing for additional exhaust heat recovery during surge control.

It will be appreciated that in alternate examples, instead of recirculating the compressed air, a portion of the boost air may be dumped to the atmosphere to improve flow through the compressor. Therein, as with the purging of the CAC condensate, valve_1 may be opened to divert the compressed air to the ejector inlet, while the EGR valves, valve_2 and valve_3 are held closed. As a result, the compressed air is diverted to the atmosphere via the exhaust tailpipe and the ejector. At this time, the ejector vacuum can be used to divert exhaust gas from downstream of the catalyst to the tailpipe via the ejector and the heat exchanger, allowing for additional exhaust heat recovery.

If it is determined (at 412) that compressor bypass flow is not desired, at 418, the routine includes determining if purging of condensate accumulating on the charge air cooler (CAC) is desired. In one example, purging of CAC condensate may be carried out based on a higher than threshold accumulation of condensate on the CAC. In another example, the purging may be carried out after regular time intervals, such as when a threshold duration has elapsed since a last purging of the CAC. Purging of CAC condensate may be carried out in an engine system embodiment wherein the first intake passage is coupled to the tailpipe from downstream of the CAC.

If it is determined that purging is desired, at 420, the valve system may be operated in the first mode. Operating in the first mode includes moving the first valve or valve_1 (such as first valve 94 in FIGS. 1A-1B) located in the first intake passage to an open position. A degree of the opening of valve_1 may be adjusted based on a level of condensate at the CAC. In addition, since EGR is not desired during the engine cold-start, the EGR valves, valve_2 and valve_3 (such as first EGR valve 96 and second EGR valve 92 in FIGS. 1A-1B) may be closed, disabling exhaust gas flow from the exhaust passage to the engine intake manifold. In response to an estimated (or predicted) charge air cooler condensate level being higher than a threshold level, at 422, boosted fresh air together with the condensate may be routed from downstream of the CAC to the tailpipe via the first intake passage and the ejector until the condensate has been purged to lower than the threshold level. While purging the condensate, vacuum may be advantageously generated at the ejector and used for drawing in exhaust, allowing for additional exhaust heat recovery.

If it is determined that CAC condensate purging is not desired, at 424, the valve system may be operated in a third operating mode. As such, as previously determined (at step 322 of FIG. 3), at this stage EGR is not desired for engine operations and consequently the two EGR valves (valve_2 and valve_3) may be actuated to a closed position. Also, the first valve (valve_1) positioned in the first intake passage may be maintained in a closed position. The third operating mode may correspond to high engine speed and/or engine load conditions. Due to the position of the valves, at 426, exhaust flow via the heat exchanger may be limited. A first, larger portion of the exhaust flowing through the main exhaust passage may directly flow to the muffler and the tailpipe. Consequently, in this operating mode, heat from the first portion of exhaust may not be recovered at the heat exchanger. A second, smaller portion of exhaust may enter the exhaust bypass assembly via the inlet and pass through the heat exchanger before exiting the assembly via the outlet. Heat from the second portion of exhaust may be recovered at the heat exchanger and may be utilized for providing heat to different vehicle components such as cylinder head and passenger cabin.

If it is determined (at 402) that heated intake air is desired for engine operations, at 404, the valve system may be operated in a fourth operating mode. In this mode, valve_1 and the first EGR valve (valve_2) may be actuated to an open position while the second EGR valve (valve_3) may be maintained in closed position. Due to the position of the respective valves, at 408, fresh air may flow from downstream of the compressor to upstream of intake manifold throttle (such as throttle 20 in FIGS. 2A-D) via the ejector, and the heat exchanger, thereby bypassing the charge air cooler. Boosted fresh air may enter the first intake passage from downstream of the compressor outlet. The fresh air may be routed to the ejector via the first intake passage. The fresh air may then flow through the heat exchanger wherein the fresh air may be heated. As valve_2 is in open position, a larger (first portion) of the heated air may enter the EGR passage. The heated air may then be delivered to the engine intake manifold via the first EGR delivery pipe. A smaller portion (second portion) of the heated air exiting the heat exchanger may exit the exhaust bypass assembly via the outlet and may flow to the tailpipe. A smaller portion of exhaust entering the exhaust bypass assembly via the inlet may also mix with the heated intake air.

At 410, while flowing through the heat exchanger, heat from the circulating coolant system may be transferred to the fresh air to provide the desired intake air temperature. In this operating mode, the coolant circulating through the heat exchanger transfers heat to the air flowing through it to increase intake air temperature (rather than absorbing heat from it). In this way, intake air may bypass the charge air cooler and be heated at the heat exchanger.

FIG. 5 is a table 500 showing example modes of operation of the engine system and the valve systems of FIGS. 1A-1B and 2A-2D. An engine controller may select one of the operating modes based on engine conditions and heating requirements. Based on the selected operating mode, the position of a first intake passage valve (valve_1) and two exhaust gas recirculation (EGR) valves (valve_2 and valve_3) may be regulated to control the flow of exhaust through a heat exchanger and/or through two EGR delivery passages. The valve system comprises valve_1 (such as valve 94 in FIGS. 1A-1B) coupled to the first intake passage, valve_2 (such as first EGR valve 96 in FIGS. 1A-1B) coupled to the first EGR delivery pipe, delivering exhaust downstream of an intake compressor and valve_3 (such as second EGR valve 92 in FIGS. 1A-1B) coupled to the second EGR delivery pipe for delivering EGR upstream of the intake compressor.

In one example, during a first engine operating mode, the controller may operate the valve system in a first operating mode such as during a cold-start condition when the engine temperature and ambient air temperature is low. In the first operating mode, the EGR valves (valve_2 and valve_3) may be in a closed position, the valve coupled to the first intake passage (valve_1) may be in an open position, and wastegate valve may be in a closed position. Due to the position of the valves, air boosted by the compressor may flow into the motive inlet of the ejector via the first intake passage, creating a low pressure region at the ejector. Consequently, hot exhaust may be drawn from the main exhaust passage into the exhaust bypass passage at the suction inlet of the ejector. The hot exhaust may then flow to the tailpipe via the heat exchanger wherein the exhaust may be cooled and the heat from the exhaust may be transferred to a coolant circulating through the heat exchanger. The heat recovered from the exhaust may be utilized for providing heat to vehicle cabin, and other vehicle components, based on requirement.

In another example, the engine may be operated in a second engine operating mode. Transitioning between the first and second modes may be based on one or more of cabin heating demand, engine temperature, and engine load, the transitioning including transitioning from the first mode to the second mode responsive to at least one of a decrease in cabin heating demand, an increase in engine temperature, and an increase in engine load, and transitioning from the second mode to the first mode responsive to an increase in cabin heating demand, a decrease in engine temperature, and a decrease in engine load.

During the second engine operating mode, the valve system may be operated in the second mode under conditions including one or more of engine temperature higher than the threshold temperature, charge air cooler condensate lower than the threshold level, operator cabin heating demand lower than the threshold demand, and when cooled EGR is desired for engine operations. In the second operating mode, the EGR valves (valve_2 and valve_3) may be actuated to open positions, and valve_1 may be maintained in the open position with a smaller opening to reduce motive flow of intake air through the ejector. In an alternate example of the second operating mode, valve_1 may be actuated to closed position to suspend motive flow. The opening of the wastegate may be adjusted based on boost demand. Due to the position of the valves, exhaust may be recirculated from the main exhaust passage to the intake manifold via the heat exchanger wherein the exhaust is cooled. The recirculating includes recirculating a first amount of exhaust to the engine intake, upstream of the compressor via a first EGR passage including a first EGR valve (valve_2) and recirculating a second amount of exhaust to the engine intake, downstream of the compressor via a second EGR passage including a second EGR valve (valve_3), wherein each of the first EGR passage and the second EGR passage are coupled to the exhaust bypass downstream of the heat exchanger, a ratio of the first amount to the second amount adjusted based on one or more of engine speed, engine load, and a surge limit of the intake compressor. The ratio of the first amount to the second amount is decreased as engine load increases, engine speed increases and as a margin to a compressor surge limit reduces below a threshold.

In this way, for engines systems as shown in both FIGS. 1A-1B (first embodiment with ejector coupled downstream of the heat exchanger) and FIGS. 2A-2D (second embodiment with ejector coupled upstream of the heat exchanger) during a first condition (such as cold-start), intake air may flow to an exhaust manifold through an ejector and ejector vacuum may be used to draw exhaust gas from an exhaust passage into a heat exchanger in an exhaust bypass; during a second condition, exhaust may be recirculated to an intake manifold through the heat exchanger via an EGR passage coupled to the exhaust bypass; and during both conditions, exhaust heat may be transferred to a coolant circulating through the heat exchanger. In the first embodiment, fresh air flows through the ejector during operation in each of the first mode and the second mode, whereas, in the second embodiment, fresh air flows through the ejector during operation in each of the first mode and the second mode and in addition, hot exhaust flows through the ejector during operation in the second mode.

In yet another example, during a third engine operating mode, the controller may operate the valve system in a third operating mode such as when EGR is not desired for engine operations. EGR may not be desired during high engine speed, and/or engine load conditions. In this mode, all three valves (valve_1, valve_2, and valve_3) may be actuated to closed positions. Due to the position of the valves, exhaust flowing through the main exhaust passage may not enter the exhaust bypass assembly and may continue to flow directly to the tailpipe. Engine systems as shown in FIGS. 1A-1B and FIGS. 2A-2D may be operated in this operational mode.

In a further example, during a fourth engine operating mode, the controller may operate the valve system in a fourth operating mode such as when heated intake air is desired and EGR is not required for engine operations. This may occur during high engine speed and/or engine load conditions. In the fourth operating mode, valve_1 and the first EGR valve (valve_2) may be in an open position while the second EGR valve (valve_3) may be maintained in closed position. Due to the position of the valves, intake air from downstream of the intake compressor and upstream of a charge air cooler may flow (via the first intake passage) through the ejector and then through the heat exchanger, wherein heat from coolant circulating through the heat exchanger may be transferred to the intake air, and then the heated intake air may be recirculated to the intake manifold, downstream of the charge air cooler via the first EGR delivery passage. The engine systems as shown in FIGS. 2A-D wherein the ejector is coupled upstream of the heat exchanger may be operated in this operational mode to deliver heated charge air to the intake manifold bypassing the charge air cooler.

In yet another example, during a fifth engine operating mode, the valve system may be operated in (or transitioned to) a fifth operating mode during conditions when compressor bypass flow is desired. Compressor bypass flow may be desired under conditions when a margin to compressor surge may be lower than a threshold (post-compressor pressure relief is required due to rapid throttle closure), and wherein the first EGR passage couples the exhaust bypass to the intake manifold downstream of the compressor and the second EGR passage coupled the exhaust bypass to the intake manifold upstream of the compressor. In one example, this may occur during a tip-out from boosted conditions and the compressor bypass flow may be desired to improve flow across the compressor and move the compressor pressure ratio away from a surge limit. In the fifth operating mode, the EGR valve recirculating charge to upstream of the compressor (valve_3) may be in an open position while the valve recirculating charge to downstream of the compressor (valve_2) may be in a closed open position, the valve coupled to the first intake passage (valve_1) may be in an open position, and wastegate valve may be in an open position. Due to the position of the valves, boosted air may be diverted away from the engine via the intake passage (allowing for a rapid drop in torque) and the boosted charge can be recirculated to the compressor inlet upon flow through the ejector. As a result, valve_1 directing air to the ejector can be advantageously used a compressor bypass valve, reducing the need for a dedicated bypass valve. By coordinating operation of valve_1 with valve_3, surge can be addressed while creating a low pressure region at the ejector for improved exhaust heat recovery. The engine systems as shown in FIGS. 2A-2D wherein the ejector is coupled upstream of the heat exchanger may be operated in this operational mode enabling compressor bypass flow.

In a yet further example, during a sixth engine operating mode, the controller may operate the valve system in the first operating mode (with valve_1 open, valve_2 and valve_3 closed) under conditions when purging of the charge air cooler (CAC) is desired. Purging of CAC condensate may be carried out in alternate embodiments of engine systems shown in FIGS. 1A-1B and 2A-2D, wherein, the first intake passage is coupled to the engine intake passage downstream of the CAC. Due to the position of the valves, boosted fresh air along with the condensate accumulated in the CAC may flow from the intake manifold from downstream of the CAC to the tailpipe via the first intake passage and the ejector. In this way, CAC condensate may be purged to the atmosphere and not towards the engine intake manifold. Therefore, the valve system may be operated in the first mode under conditions including one or more of engine temperature lower than a threshold temperature, charge air cooler condensate higher than a threshold level, and operator cabin heating demand higher than a threshold demand.

In this way, based on engine operating conditions, exhaust may be routed through the exhaust bypass assembly without the requirement of any diverter valve. In addition, during surge conditions, boosted air may be routed through the exhaust bypass assembly without the requirement for a compressor bypass valve. During cold-start conditions, the ejector coupled to the exhaust bypass assembly may be utilized to route exhaust through the heat exchanger facilitating exhaust heat recovery. The first intake passage and the first EGR delivery pipe may be used to bypass the cooler and to delivery heated intake air to the engine intake manifold based on demand.

Figure 6:
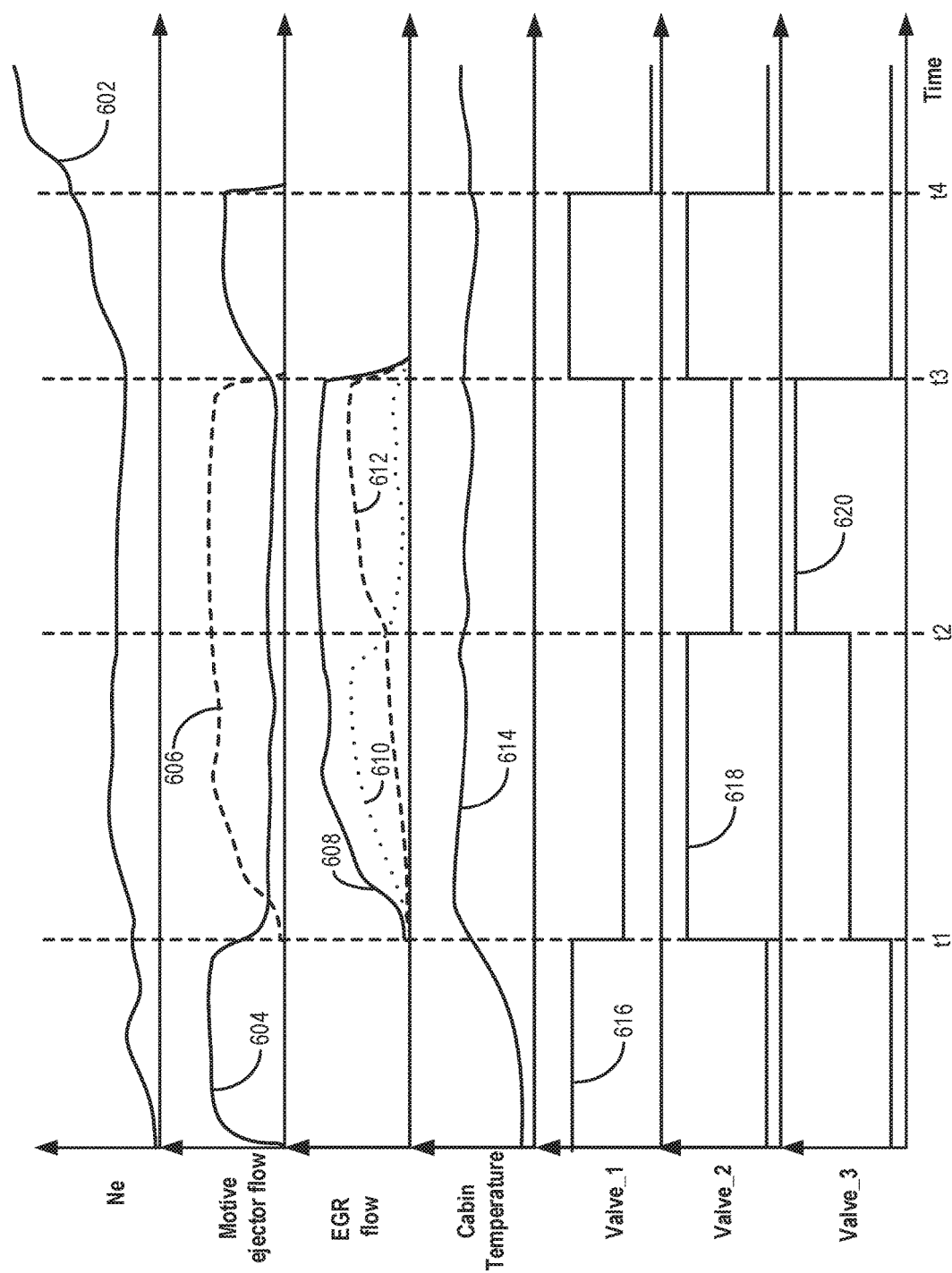
FIG. 6 shows an example operation of the exhaust bypass assembly and the EGR system, according to the present disclosure.

FIG. 6 shows an example operating sequence 600 illustrating coordinated operation of the exhaust bypass assembly and the exhaust gas recirculation (EGR) system of FIGS. 2A-2D. Flow of exhaust and fresh air through the heat exchanger is determined based on engine operations. The horizontal (x-axis) denotes time and the vertical markers t1-t4 identify significant times in the operation of the exhaust bypass assembly and the EGR system.

The first plot, line 602, shows variation in engine speed over time. The second plot, line 604, shows motive flow of fresh air through the ejector coupled to the exhaust bypass assembly. Dashed line 606 shows motive flow of hot exhaust gas through the ejector. The third plot, line 608, shows EGR flow from the exhaust to the intake manifold for desired combustion and emissions-control performance. EGR flow may depend on engine operating conditions such as engine load, engine speed, engine temperature, etc. Dotted line 610 shows EGR flow from the exhaust manifold to downstream of the compressor outlet while the dashed line 612 shows EGR flow from the exhaust manifold to upstream of the compressor inlet. A ratio of EGR delivered to the intake manifold upstream of the compressor to that of EGR delivered downstream of the compressor may be determined based on engine operating conditions and compressor operations. The fourth plot, line 614, shows variation in vehicle cabin temperature over time. The fifth plot, line 616, indicates the degree of opening of a first valve (valve_1) located in the first intake passage. The sixth plot, line 618, indicates the degree of opening of a first EGR valve (valve_2) located in the first EGR delivery pipe. The seventh plot, line 620, indicates the degree of opening of a second EGR valve (valve_3) located in the second EGR delivery pipe.

Prior to time t1, the engine starts from rest after a period of inactivity during which the vehicle was not propelled using the engine. The engine may start under cold-start conditions with low engine temperature. As seen from the first plot (line 602), as the engine starts, the engine speed is low and the engine speed gradually increases to a steady level. During the cold-start condition, EGR may not be desired for engine operations, therefore, the EGR valves (valve_2 and valve_3) may be maintained in closed position, and there is little or no EGR flow from the exhaust passage to the engine intake manifold.

When the vehicle starts up, the vehicle cabin temperature may be low as the cabin heating may not have been operational prior to engine start-up. In response to a demand for vehicle cabin heating, a wastegate valve coupled to a wastegate passage of the exhaust turbine may be closed in order to route hot exhaust via the heat exchanger.

During this period, due to the closing of the wastegate, the turbine may spin-up and boosted fresh air from downstream of an intake compressor may enter the first intake passage via valve_1 and may be routed to the tailpipe through the ejector. A degree of opening of valve_1 may be adjusted based on one or more of turbine speed, boost demand, and operator cabin heating demand. In this example, the opening of valve_1 may be increased (to a maximum level) due to high cabin heating demands. Due to the motive flow of fresh air through the ejector, a low pressure area may be created at the heat exchanger which enables hot exhaust flowing through the main exhaust passage to enter the exhaust bypass assembly. The hot exhaust may then flow to the tailpipe via the heat exchanger wherein the exhaust may be cooled and the heat from the exhaust may be transferred to a coolant circulating through the heat exchanger. In this example, since prior to t1 the vehicle cabin temperature is low, the coolant from the heat exchanger may be circulated from the heat exchanger to the vehicle heater core for utilization in heating the cabin to a temperature level as desired by the user.

Also, prior to time t1, for the alternate embodiment of FIGS. 2A-2D, wherein the first intake passage is coupled to the engine intake passage downstream of the charge air cooler (CAC), condensate accumulated on the CAC may be purged. The accumulated condensate together with the fresh (boosted) air may be routed from downstream of an intake compressor and downstream of the charge air cooler to the tailpipe via the ejector and the bypass passage.

At time t1, the engine temperature may have increased to a desired level and cooled EGR may be desired for engine operations. In response to the demand for cooled EGR, the two EGR valves, valve_2, and valve_3 may be actuated to open positions. Also, at this time, the opening of valve_1 may be reduced. The opening of each of the EGR valves may be adjusted based on the desired EGR ratio (EGR delivered downstream of compressor to EGR delivered upstream of compressor). Between time t1 and t2, the margin to a compressor surge limit may be above a threshold and therefore during this time, valve_2 may be opened to a greater extent to deliver a larger fraction of EGR to downstream of the compressor and valve_3 may be opened to a lesser extent to deliver a smaller fraction of EGR to upstream of the compressor.

During this time, a smaller volume (compared to the volume of motive flow prior to time t1) of boosted fresh air flows from the intake manifold to the tailpipe via the ejector. Due to the low pressure across the ejector and the opening of the EGR valves (valve_2 and valve_3), hot exhaust flowing through the main exhaust passage may be routed to enter the inlet pipe of the exhaust bypass assembly and flow via the ejector, and the heat exchanger. At the heat exchanger, the exhaust may be cooled and the heat from the exhaust may be transferred to a coolant circulating through the heat exchanger. Heat recovered at the heat exchanger may be utilized for cabin heating and/or cylinder head heating purposes. After exiting the heat exchanger, the cooled exhaust may enter the EGR delivery passage to be delivered to the engine intake manifold downstream of the compressor outlet (via the first EGR delivery pipe) and to the intake passage upstream of the compressor inlet (via the second EGR delivery pipe).

At time t2, it may be observed that the margin to the compressor surge limit is below a threshold. In response to the change in compressor pressure ratio, the ratio of EGR volume delivered downstream to that delivered upstream of the compressor may be adjusted to shift compressor operation away from its surge limit. Therefore, between time t2 and t3, valve_2 may be opened to a lesser extent to deliver a smaller fraction of EGR to downstream of the compressor and valve_3 may be opened to a greater extent to deliver a larger fraction of EGR to upstream of the compressor.

Between time t1 and t3, exhaust gas (not fresh air) flows through the ejector as motive flow.

At time t3, there may be an increase in engine speed, in response to which, EGR may no longer be desired, and heated intake air may be desired for engine operations. In order to supply heated intake air to the engine intake manifold, valve_1, and valve_2 may be actuated to open positions. The opening of each of the valves may be regulated to admit a desired amount of heated charge air into the engine intake manifold. Due to the position of the valves, intake air may from upstream of the charge air cooler (CAC) may flow to downstream of the CAC via the first intake passage, the ejector, the heat exchanger, and the first EGR delivery passage. Between time t3 and t4, a higher volume of fresh air may flow through the ejector as motive flow. At the heat exchanger, heat from the circulating coolant may be transferred to the fresh air thereby increasing the air temperature. In this way, intake air may bypass the CAC and also get additionally heated at the heat exchanger.

At time t4, based on engine operating parameters (e.g., engine speed, load, temperature) it may be determined that EGR and heated intake air are not desired for engine operations. Consequently, each of the three valves, valve_1, valve_2, and valve_3, may be actuated to closed positions. After time t4, due to the position of the valves, exhaust flowing through the main exhaust passage may not enter the exhaust bypass assembly and may directly flow downstream towards the muffler and the tailpipe. Therefore, during this time there is no motive flow across the ejector. In this way, heating demands and EGR requirements of an engine may be fulfilled by routing exhaust gas and fresh air through an exhaust bypass assembly including an ejector without the requirement of a diverter valve.

In one example, a method for a turbocharged engine comprises, during an engine cold-start condition, closing a wastegate coupled across an exhaust turbine while flowing air from downstream of an intake compressor to a tailpipe via an ejector; and drawing exhaust flow from downstream of an exhaust catalyst into a heat exchanger coupled in an exhaust bypass via ejector generated vacuum. The preceding example method may additionally or optionally further comprising transferring heat from the exhaust flow to a coolant flowing through the heat exchanger; flowing the heated coolant through a heater core; and heating a vehicle cabin by drawing intake air through the heater core, wherein the transferring heat is based on an engine heating demand, the engine heating demand including an operator cabin heating demand and a cylinder head heating demand. In any or all of the preceding examples, additionally or optionally, flowing air from downstream of the intake compressor to the tailpipe includes opening a first valve in a first intake passage coupling an engine intake manifold, downstream of the compressor, to a motive inlet of the ejector, and flowing air boosted by the compressor into the motive inlet of the ejector, the compressor driven by the exhaust turbine, a degree of opening the first valve adjusted based on one or more of turbine speed, boost demand, and operator cabin heating demand. In any or all of the preceding examples, additionally or optionally, flowing air from downstream of the intake compressor includes flowing air from upstream of a charge air cooler, and wherein adjusting the degree of opening of the first valve includes increasing the opening of the first valve as turbine speed increases, engine boost demand increases and cabin heating demand increases. In any or all of the preceding examples, additionally or optionally, the ejector is coupled downstream of the heat exchanger in the exhaust bypass, the method further comprising, after meeting the operator cabin heating demand, reducing an opening of the first valve to reduce motive flow across the ejector, and thereafter recirculating exhaust from downstream of the exhaust catalyst to the engine intake manifold via the heat exchanger, bypassing the ejector. In any or all of the preceding examples, additionally or optionally, the recirculating includes recirculating a first amount of exhaust to the engine intake, upstream of the compressor via a first EGR passage including a first EGR valve and recirculating a second amount of exhaust to the engine intake, downstream of the compressor via a second EGR passage including a second EGR valve, wherein each of the first EGR passage and the second EGR passage are coupled to the exhaust bypass downstream of the heat exchanger, a ratio of the first amount to the second amount adjusted based on one or more of engine speed, engine load, and a surge limit of the intake compressor. In any or all of the preceding examples, the ratio of the first amount to the second amount is additionally or optionally decreased as engine load increases, engine speed increases and as a margin to a compressor surge limit reduces below a threshold. In any or all of the preceding examples, additionally or optionally, the ejector is coupled upstream of the heat exchanger in the bypass, the method further comprising, after engine temperature is higher than a threshold, adjusting an opening of the wastegate based on boost demand, closing the first valve to suspend flow of intake air through the ejector, and recirculating exhaust gas from downstream of the exhaust catalyst to the intake manifold via each of the ejector and the heat exchanger. Any or all of the preceding examples further comprises, additionally or optionally, in response to a request for heated intake air, opening the first valve to flow intake air from downstream of the intake compressor and upstream of a charge air cooler through the ejector and then through the heat exchanger, transferring heat from coolant circulating through the heat exchanger to the intake air, and then recirculating the heated intake air to the intake manifold, downstream of the charge air cooler. In any or all of the preceding examples, additionally or optionally, flowing air from downstream of the intake compressor includes flowing air from downstream of the compressor and downstream of a charge air cooler, the method further comprising, in response to charge air cooler condensate being higher than a threshold level, opening the first valve to flow air from downstream of the charge air cooler to the tailpipe via the first intake passage and the ejector until the condensate has been purged to lower than the threshold level.

Another example method comprises during a first condition, flowing intake air to an exhaust manifold through an ejector and using ejector vacuum to draw exhaust gas from an exhaust passage into a heat exchanger in an exhaust bypass; during a second condition, recirculating exhaust to an intake manifold through the heat exchanger via an EGR passage coupled to the exhaust bypass; and during both conditions, transferring exhaust heat to coolant circulating through the heat exchanger. In the preceding example method, additionally or optionally, the ejector is coupled upstream of the heat exchanger and wherein recirculating exhaust to the intake manifold through the heat exchanger during the second condition includes flowing exhaust gas through the ejector. In any or all of the preceding examples, additionally or optionally, the ejector is coupled downstream of the heat exchanger and wherein recirculating exhaust to the intake manifold through the heat exchanger during the second condition includes flowing exhaust gas through the heat exchanger in the exhaust bypass into an EGR passage while bypassing the ejector. In any or all of the preceding examples, additionally or optionally, flowing intake air include flowing from downstream of an intake compressor and downstream of a charge air cooler, wherein the first condition includes one or more of engine temperature lower than a threshold temperature, charge air cooler condensate higher than a threshold level, and operator cabin heating demand higher than a threshold demand, and wherein the second condition includes one or more of engine temperature higher than the threshold temperature, charge air cooler condensate lower than the threshold level, and operator cabin heating demand lower than the threshold demand. In any or all of the preceding examples, additionally or optionally, the compressor is driven by an exhaust turbine and during the first condition, a wastegate coupled across the wastegate is fully closed and wherein during the second condition, the wastegate is at least partially open. In any or all of the preceding examples, additionally or optionally, the EGR passage is a first EGR passage, the method further comprising, during a third condition, flowing cooler intake air from downstream of the compressor and upstream of the charge air cooler through each of the ejector and the heat exchanger, transferring heat from the circulating coolant circulating to the cooler intake air at the heat exchanger, and then recirculating heated intake air to the intake manifold, downstream of the charge air cooler via the first EGR passage; and during a fourth condition, recirculating intake air from downstream of the compressor to upstream of the compressor via the ejector, the heat exchanger, and a second EGR passage, wherein the fourth condition includes a margin to compressor surge being lower than a threshold, and wherein the first EGR passage couples the exhaust bypass to the intake manifold downstream of the compressor and the second EGR passage coupled the exhaust bypass to the intake manifold upstream of the compressor.

In yet another example, a vehicle system, comprises a vehicle cabin, an engine intake manifold including an upstream compressor and a downstream charge air cooler, an engine exhaust manifold including an exhaust catalyst and a muffler coupled to each other via each of an exhaust passage and an exhaust bypass, the bypass including a heat exchanger and an ejector, an exhaust turbine upstream of the exhaust catalyst, the turbine driving the compressor, a wastegate passage including a wastegate valve coupled across the exhaust turbine, a coolant system fluidly coupling the heat exchanger to a heater core, a first passage including a first valve connecting the engine intake manifold from downstream of the compressor to the exhaust bypass, an EGR system coupling the exhaust bypass downstream of the heat exchanger to the intake manifold, the EGR system including each of a first EGR passage with a first EGR valve for recirculating exhaust upstream of the compressor and a second EGR passage with a second EGR valve for recirculating exhaust downstream of the charge air cooler, and a controller with computer readable instructions stored on non-transitory memory for operating in a first mode with the wastegate valve closed and the first valve open to flow air from the intake manifold towards the muffler via the ejector, using low pressure generated across the ejector to route exhaust from downstream of the catalyst into the muffler via the heat exchanger, transferring heat from the exhaust to the coolant system, and circulating heated coolant through the heater core, and operating in a second mode with each of the first valve, the first EGR valve and the second EGR valve open to route exhaust to the engine intake manifold via the heat exchanger, transferring heat from the exhaust to the coolant system, and circulating heater coolant through the heater core. In the preceding example method, additionally or optionally, the controller includes further instructions for: transitioning between the first and second modes based on one or more of cabin heating demand, engine temperature, and engine load, the transitioning including transitioning from the first mode to the second mode responsive to at least one of a decrease in cabin heating demand, an increase in engine temperature, and an increase in engine load, and transitioning from the second mode to the first mode responsive to an increase in cabin heating demand, a decrease in engine temperature, and a decrease in engine load. In any or all of the preceding examples, additionally or optionally, the first passage is coupled downstream of the CAC and wherein transitioning to the first mode is further based on a CAC condensate level, CAC condensate is routed to the tailpipe via the exhaust bypass and the ejector. In any or all of the preceding examples, additionally or optionally, the ejector is coupled upstream of the heat exchanger, wherein the controller includes further instructions for transitioning to a third mode responsive to a demand for heated charge air, and operating in the third mode with charge air routed from upstream of the CAC to downstream of the CAC via the heat exchanger, the charge air heated at the heat exchanger by transfer of heat from the coolant system to the charge air.

In a further representation, a method for a turbocharged engine comprises: responsive to a demand for compressor bypass flow, recirculating a portion of boosted air from downstream of the compressor to upstream of the compressor via an ejector; and drawing exhaust flow from downstream of an exhaust catalyst into a heat exchanger coupled in an exhaust bypass via ejector generated vacuum. In the preceding example, the demand for compressor bypass flow is in response to one or more of an operator tip-out event, and an indication of compressor surge. In any or all of the preceding examples, additionally or optionally, a degree of opening of the valve and the portion of boosted air recirculated to upstream of the compressor is based on each of a margin to compressor surge and engine heating demand. In any or all of the preceding examples, additionally or optionally, recirculating a portion of boosted air from downstream of the compressor to upstream of the compressor via an ejector includes opening a first valve coupled in a first passage coupling an engine intake passage, downstream of the compressor, to a motive inlet of the ejector, the ejector coupled in the exhaust bypass, and further opening a second valve coupled in an EGR passage, the EGR passage coupling the exhaust bypass to the intake passage, upstream of the compressor. In any or all of the preceding examples, additionally or optionally, the method further comprises mixing the drawn exhaust flow with the portion of boosted air before recirculating a charge mixture to upstream of the compressor. In any or all of the preceding examples, additionally or optionally, the method further comprises transferring heat from the drawn exhaust flow to a coolant flowing through the heat exchanger.

In a yet further representation, an engine system comprises an ejector coupled in an exhaust bypass, upstream of the heat exchanger, a first intake passage coupling an engine intake manifold from downstream of a compressor to a motive inlet of the ejector; a first EGR delivery passage coupling the exhaust bypass from downstream of the heat exchanger to the engine intake manifold, downstream of the compressor, and a second EGR delivery passage coupling the exhaust bypass from downstream of the heat exchanger to the engine intake manifold, upstream of the compressor. In any or all of the preceding examples, additionally or optionally, the system further comprises a first valve coupled to the first intake passage, a second valve coupled to the first EGR delivery passage, a third valve coupled to the second EGR delivery passage, and a controller with computer readable instructions stored on non-transitory memory for: operating the engine system in at least one of, and optionally each of, a first mode, a second mode, a third mode, and a fourth mode via adjustments to one or more of the first valve, the second valve, and the third valve. In any or all of the preceding examples, additionally or optionally, operation in the first mode comprises: opening the first valve and closing each of the second and the third valve to flow intake air to an exhaust tailpipe through the ejector via the first intake passage, using ejector vacuum to draw exhaust gas from an exhaust passage, downstream of an exhaust catalyst, into the heat exchanger in the exhaust bypass, and transferring exhaust heat to coolant circulating through the heat exchanger. In any or all of the preceding examples, additionally or optionally, while operating in the first mode, an exhaust wastegate valve coupled to a turbine driving the compressor may be closed. In any or all of the preceding examples, additionally or optionally, operation in the first mode is carried out during one or more conditions including engine temperature lower than a threshold temperature, charge air cooler condensate higher than a threshold level, and operator cabin heating demand higher than a threshold demand In any or all of the preceding examples, additionally or optionally, operation in the second mode comprises: opening each of the first valve, the second valve, and the third valve to recirculate exhaust to the intake manifold through the heat exchanger via each of the first EGR delivery passage and the second EGR delivery passage, and transferring exhaust heat to coolant circulating through the heat exchanger. In any or all of the preceding examples, additionally or optionally, operation in the second mode is carried out during one or more conditions including engine temperature higher than the threshold temperature, charge air cooler condensate lower than the threshold level, and operator cabin heating demand lower than the threshold demand. In any or all of the preceding examples, additionally or optionally, operation in the third mode comprises: opening each of the first valve and the second valve, closing the third valve to flow cooler intake air from downstream of the compressor and upstream of a charge air cooler through each of the ejector and the heat exchanger, transferring heat from the circulating coolant to the cooler intake air at the heat exchanger, and then recirculating heated intake air to the intake manifold, downstream of the charge air cooler via the first EGR passage. In any or all of the preceding examples, additionally or optionally, operation in the third mode is carried out during a higher than threshold demand for charge air heating. In any or all of the preceding examples, additionally or optionally, operation in the fourth mode comprises: opening each of the first valve and the third valve, and closing the second valve to recirculate intake air from downstream of the compressor to upstream of the compressor via the ejector, the heat exchanger, and the second EGR delivery passage. In any or all of the preceding examples, additionally or optionally, operation in the fourth mode is carried out when a margin to compressor surge is lower than a threshold. In any or all of the preceding examples, additionally or optionally, the controller may include instructions for transitioning between the modes responsive to a change in engine operating conditions, such as a change in boost demand, change in engine temperature, change in cabin heating demand, and change in compressor inlet pressure.

In this way, by utilizing motive flow of intake air through an ejector coupled to an exhaust bypass assembly for diverting exhaust via a heat exchanger, heat recovery from exhaust may be carried out during conditions such as cold-start, without relying on costly exhaust diverter valves. In addition, by drawing the motive flow of intake air from downstream of a charge air cooler, condensate accumulated at the cooler may be effectively purged while generating ejector vacuum for exhaust heat recovery. By purging the condensate to the exhaust manifold, the occurrence of misfire events may be reduced. The technical effect of closing the waste gate valve during cold-start conditions while flowing intake air through the ejector in an exhaust bypass is that turbine spin-up can be expedited, thereby reducing turbo lag while recovering exhaust heat at the heat exchanger. As a result, boost pressure can be provided while exhaust heat is recovered. In addition, the intake air received at the ejector may itself be heated using the heat recovered at the heat exchanger before the intake air is recirculated to the engine intake via an EGR passage. Further, by reducing the need for exhaust throttles for exhaust heat recovery, issues associated with degraded throttle operation may be averted. By recirculating boosted air from downstream of the compressor to upstream of the compressor upon passage through an ejector coupled in the exhaust bypass, compressor recirculation can be synergized with exhaust heat recovery. In particular, compressor surge can be addressed without the need for a dedicated compressor bypass passage or bypass valve, while using the compressor bypass flow for drawing exhaust for expedited exhaust heat recovery. By directing EGR through the heat exchanger, the same heat exchanger may be used as an exhaust heat recovery device and as an EGR cooler, providing component reduction benefits. Overall, boosted engine performance is improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a turbocharged engine comprising:
   during an engine cold-start condition,
      closing a wastegate coupled across an exhaust turbine while flowing air from downstream of an intake compressor to a tailpipe via an ejector; and
      drawing exhaust flow from downstream of an exhaust catalyst into a heat exchanger coupled in an exhaust bypass via ejector generated vacuum.

2. The method of claim 1, further comprising,
   transferring heat from the exhaust flow to a coolant flowing through the heat exchanger; flowing the heated coolant through a heater core; and
   heating a vehicle cabin by drawing intake air through the heater core, wherein the transferring heat is based on an engine heating demand, the engine heating demand including an operator cabin heating demand and a cylinder head heating demand.

3. The method of claim 1, wherein flowing air from downstream of the intake compressor to the tailpipe includes opening a first valve in a first intake passage coupling an engine intake manifold, downstream of the compressor, to a motive inlet of the ejector, and flowing air boosted by the compressor into the motive inlet of the ejector, the compressor driven by the exhaust turbine, a degree of opening of the first valve adjusted based on one or more of turbine speed, boost demand, and operator cabin heating demand.

4. The method of claim 3, wherein flowing air from downstream of the intake compressor includes flowing air from upstream of a charge air cooler, and wherein adjusting the degree of opening of the first valve includes increasing the opening of the first valve as turbine speed increases, engine boost demand increases and cabin heating demand increases.

5. The method of claim 3, wherein the ejector is coupled downstream of the heat exchanger in the exhaust bypass, the method further comprising, after meeting the operator cabin heating demand, reducing an opening of the first valve to reduce motive flow across the ejector, and thereafter recirculating exhaust from downstream of the exhaust catalyst to the engine intake manifold via the heat exchanger, bypassing the ejector.

6. The method of claim 5, wherein the recirculating includes recirculating a first amount of exhaust to the engine intake manifold, upstream of the compressor via a first EGR passage including a first EGR valve and recirculating a second amount of exhaust to the engine intake manifold, downstream of the compressor via a second EGR passage including a second EGR valve, wherein each of the first EGR passage and the second EGR passage are coupled to the exhaust bypass downstream of the heat exchanger, a ratio of the first amount to the second amount adjusted based on one or more of engine speed, engine load, and a surge limit of the intake compressor.

7. The method of claim 6, wherein the ratio of the first amount to the second amount is decreased as engine load increases, engine speed increases, and as a margin to a compressor surge limit reduces below a threshold.

8. The method of claim 3, wherein the ejector is coupled upstream of the heat exchanger in the exhaust bypass, the method further comprising, after engine temperature is higher than a threshold, adjusting an opening of the wastegate based on boost demand, closing the first valve to suspend flow of intake air through the ejector, and recirculating exhaust gas from downstream of the exhaust catalyst to the intake manifold via each of the ejector and the heat exchanger.

9. The method of claim 8, further comprising, in response to a request for heated intake air, opening the first valve to flow intake air from downstream of the intake compressor and upstream of a charge air cooler through the ejector and then through the heat exchanger, transferring heat from coolant circulating through the heat exchanger to the intake air, and then recirculating the heated intake air to the intake manifold, downstream of the charge air cooler.

10. The method of claim 3, wherein flowing air from downstream of the intake compressor includes flowing air from downstream of the compressor and downstream of a charge air cooler, the method further comprising, in response to charge air cooler condensate being higher than a threshold level, opening the first valve to flow air from downstream of the charge air cooler to the tailpipe via the first intake passage and the ejector until the condensate has been purged to lower than the threshold level.

11. A method comprising:
   during a first condition, flowing intake air to an exhaust manifold through an ejector and using ejector vacuum to draw exhaust gas from an exhaust passage into a heat exchanger in an exhaust bypass;
   during a second condition, recirculating exhaust to an intake manifold through the heat exchanger via an EGR passage coupled to the exhaust bypass; and
   during both conditions, transferring exhaust heat to coolant circulating through the heat exchanger.

12. The method of claim 11, wherein the ejector is coupled upstream of the heat exchanger and wherein recirculating exhaust to the intake manifold through the heat exchanger during the second condition includes flowing exhaust gas through the ejector.

13. The method of claim 11, wherein the ejector is coupled downstream of the heat exchanger and wherein recirculating exhaust to the intake manifold through the heat exchanger during the second condition includes flowing exhaust gas through the heat exchanger in the exhaust bypass into an EGR passage while bypassing the ejector.

14. The method of claim 11, wherein flowing intake air includes flowing from downstream of an intake compressor and downstream of a charge air cooler, wherein the first condition includes one or more of an engine temperature lower than a threshold temperature, a charge air cooler condensate higher than a threshold level, and an operator cabin heating demand higher than a threshold demand, and wherein the second condition includes one or more of the engine temperature higher than the threshold temperature, the charge air cooler condensate lower than the threshold level, and the operator cabin heating demand lower than the threshold demand.

15. The method of claim 14, wherein the compressor is driven by an exhaust turbine and during the first condition, a wastegate coupled across the exhaust turbine is fully closed and wherein during the second condition, the wastegate is at least partially open.

16. The method of claim 14, wherein the EGR passage is a first EGR passage, the method further comprising, during a third condition, flowing cooler intake air from downstream of the compressor and upstream of the charge air cooler through each of the ejector and the heat exchanger, transferring heat from the circulating coolant circulating to the cooler intake air at the heat exchanger, and then recirculating heated intake air to the intake manifold, downstream of the charge air cooler via the first EGR passage; and during a fourth condition, recirculating intake air from downstream of the compressor to upstream of the compressor via the ejector, the heat exchanger, and a second EGR passage, wherein the fourth condition includes a margin to compressor surge being lower than a threshold, and wherein the first EGR passage couples the exhaust bypass to the intake manifold downstream of the compressor and the second EGR passage coupled the exhaust bypass to the intake manifold upstream of the compressor.

17. A vehicle system, comprising:
a vehicle cabin;
an engine intake manifold including a compressor upstream of a charge air cooler (CAC);
an engine exhaust including an exhaust catalyst and a muffler coupled to each other via an exhaust passage, the exhaust passage further including an exhaust bypass, the bypass including a heat exchanger and an ejector;
an exhaust turbine upstream of the exhaust catalyst, the turbine driving the compressor;
a wastegate passage including a wastegate valve coupled across the exhaust turbine;
a coolant system fluidly coupling the heat exchanger to a heater core;
a first passage including a first valve connecting the engine intake manifold from downstream of the compressor to the exhaust bypass;
an EGR system coupling the exhaust bypass downstream of the heat exchanger to the intake manifold, the EGR system including each of a first EGR passage with a first EGR valve for recirculating exhaust upstream of the compressor and a second EGR passage with a second EGR valve for recirculating exhaust downstream of the charge air cooler; and
a controller with computer readable instructions stored on non-transitory memory for:
operating in a first mode with the wastegate valve closed and the first valve open to flow air from the intake manifold towards the muffler via the ejector, using low pressure generated across the ejector to route exhaust from downstream of the catalyst into the muffler via the heat exchanger, transferring heat from the exhaust to the coolant system, and circulating heated coolant through the heater core; and
operating in a second mode with each of the first valve, the first EGR valve, and the second EGR valve open to route exhaust to the engine intake manifold via the heat exchanger, transferring heat from the exhaust to the coolant system, and circulating heater coolant through the heater core.

18. The system of claim 17, wherein the controller includes further instructions for: transitioning between the first and second modes based on one or more of cabin heating demand, engine temperature, and engine load, the transitioning including transitioning from the first mode to the second mode responsive to at least one of a decrease in cabin heating demand, an increase in engine temperature, and an increase in engine load, and transitioning from the second mode to the first mode responsive to an increase in cabin heating demand, a decrease in engine temperature, and a decrease in engine load.

19. The system of claim 18, wherein the first passage is coupled downstream of the CAC and wherein transitioning to the first mode is further based on a CAC condensate level, CAC condensate is routed to the muffler via the exhaust bypass and the ejector.

20. The system of claim 17, wherein the ejector is coupled upstream of the heat exchanger, wherein the controller includes further instructions for transitioning to a third mode responsive to a demand for heated charge air, and operating in the third mode with charge air routed from upstream of the CAC to downstream of the CAC via the heat exchanger, the charge air heated at the heat exchanger by transfer of heat from the coolant system to the charge air cooler.

* * * * *